(12) United States Patent
Enns

(10) Patent No.: US 7,519,731 B1
(45) Date of Patent: Apr. 14, 2009

(54) COMPARING CONFIGURATION INFORMATION FOR A DATA FORWARDING DEVICE

(75) Inventor: Robert P. Enns, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1005 days.

(21) Appl. No.: 09/734,324

(22) Filed: Dec. 1, 2000

(51) Int. Cl.
  *G06F 15/173* (2006.01)
(52) U.S. Cl. ...................................... 709/238; 709/242
(58) Field of Classification Search ................. 709/220, 709/221, 238, 242
  See application file for complete search history.

(56) References Cited

U.S. PATENT DOCUMENTS

| | | | | |
|---|---|---|---|---|
| 5,155,847 A | * | 10/1992 | Kirouac et al. | 709/211 |
| 5,247,683 A | * | 9/1993 | Holmes et al. | 709/221 |
| 5,261,044 A | * | 11/1993 | Dev et al. | 715/855 |
| 5,544,303 A | * | 8/1996 | Maroteaux et al. | 345/733 |
| 5,619,716 A | * | 4/1997 | Nonaka et al. | 717/167 |
| 5,745,669 A | * | 4/1998 | Hugard et al. | 714/3 |
| 5,806,071 A | * | 9/1998 | Balderrama et al. | 707/104.1 |
| 5,832,503 A | * | 11/1998 | Malik et al. | 709/223 |
| 5,960,204 A | * | 9/1999 | Yinger et al. | 717/176 |
| 6,240,511 B1 | * | 5/2001 | Blumenau et al. | 713/1 |
| 6,349,306 B1 | * | 2/2002 | Malik et al. | 707/103 R |
| 6,421,719 B1 | * | 7/2002 | Lewis et al. | 709/224 |
| 6,438,606 B1 | * | 8/2002 | Ward | 709/238 |
| 6,453,346 B1 | * | 9/2002 | Garg et al. | 709/224 |
| 6,587,874 B1 | * | 7/2003 | Golla et al. | 709/220 |
| 6,778,523 B1 | * | 8/2004 | Masilamany | 370/351 |
| 6,959,332 B1 | * | 10/2005 | Zavalkovsky et al. | 709/223 |
| 7,054,924 B1 | * | 5/2006 | Harvey et al. | 709/220 |

OTHER PUBLICATIONS

Solarwinds.Net, "Cisco Config Viewer", Aug. 17, 2000, http://solarwinds.net/Tools/Cisco_Networking/Conifg_Viewer/index,ht.*
"RANCID—Really Awesome New Cisco conflg Differ", downloaded from: http://www.shrubbery.net/rancid/ on Nov. 30, 2000, 3 pages.

* cited by examiner

*Primary Examiner*—Patrice Winder
*Assistant Examiner*—Thomas Duong
(74) *Attorney, Agent, or Firm*—Straub and Pokotylo; John C. Pokotylo

(57) ABSTRACT

Techniques for comparing sets of configuration information for data forwarding devices, such as routers, are disclosed. Scoping may be used to limit comparisons to particular hierarchical levels and/or categories of sets of configuration information. Different users may have different permissions regarding viewing, or editing different parts of configuration information.

27 Claims, 38 Drawing Sheets

*[edit chassis] Hierarchy Level*

```
chassis {
  alarm {
    interface-type {
      alarm-name (red | yellow | ignore);
    }
  }
  filter-check days;
  fpc slot-number {
    pic pic-number {
      framing (sdh | sonet);
      no-concatenate;
    }
  }
  (no-source-route | source-route);
  redundancy {
    routing-engine slot-number (master | backup | disabled );
    ssb slot-number (always | preferred);
  }
} # End of [edit chassis] hierarchy level
```

FIGURE 8

*[edit class-of-service] Hierarchy Level*

```
class-of-service {
  input {
    fpc fpc-number {
      precedence-map map-name;
    }
    interfaces {
      interface-name {
        inet-precedence-map;
        mpls-cos-map;
        unit unit-number {
          output-queue queue-number;
        }
      }
    }
    precedence-map map-name {
      bits precedence-bit output-queue queue-number;
    }
  }
  output {
    drop-profile profile-name {
      stream-profile {
        fill-level fill-percentage drop-probability probability-percentage;
      }
      plp-set-queue-profile {
        fill-level fill-percentage drop-probability probability-percentage;
      }
      plp-clear-queue-profile {
        fill-level fill-percentage drop-probability probability-percentage;
      }
    }
    fpc fpc-number {
      drop-profile profile-name;
    }
    interfaces {
      interface-name {
        transmit-queues {
          output-queue queue-number bandwidth percentage;
        }
        weighted-round-robin {
          output-queue queue-number weight percentage;
        }
        unit unit-number {
          precedence-rewrite {
            output-queue queue-number {
              plp-clear rewrite-bits precedence-bit;
              plp-set rewrite-bits precedence-bit;
            }
          }
        }
      }
    }
  }
  policy {
    class class-name {
      classification-override {
        output-queue queue-number;
      }
    }
  }
} # End of [edit class-of-service] hierarchy level
```

FIGURE 9

*[edit firewall] Hierarchy Level*

```
firewall {
    filter filter-name {
        term term-name {
            from {
                match-conditions;
            }
            then {
                action;
                action-modifiers;
            }
        }
    }
}   # End of [edit firewall] hierarchy level
```

FIGURE 10

*[edit forwarding-options] Hierarchy Level*

```
forwarding-options {
    sampling {
        disable;
        input {
            family inet {
                rate number;
                run-length number;
            }
        }
        output {
            cflowd hostname {
                engine-id idnumber;
                (local-dump | no-local-dump);
                port portnumber;
                version format;
            }
            file {
                filename filename;
                files number;
                size bytes;
                (stamp | no-stamp);
                (world-readable | no-world-readable);
            }
        }
        traceoptions {
            file filename {
                files number;
                size bytes;
                (world-readable | no-world-readable);
            }
        }
    }
} #End of [edit forwarding-options] hierarchy level
```

FIGURE 11

*[edit groups] Hierarchy Level*

```
groups {
    group-name {
        configuration-data;
    }
} #End of [edit groups] hierarchy level
```

FIGURE 12

*[edit interfaces] Hierarchy Level*

```
interfaces {
    traceoptions {
        file filename <size size> <files number>;
    }
    interface-name {
        disable;
        atm-options {
            vpi vpi-identifier max-vcs vcs-value;
            ilmi;
        }
        clocking clock-source;
        dce;
        description text;
        e1-options {
            fcs (32 | 16);
            framing (g704 | unframed);
            idle-cycle-flag (flags | ones);
            loopback (local | remote);
            start-end-flag (shared | filler);
            timeslots slot-number;
        }
        e3-options {
            bert-algorithm algorithm;
            bert-error-rate rate;
            bert-period seconds;
            compatibility-mode (digital-link | kentrox);
            fcs (32 | 16);
            idle-cycle-flag value;
            loopback (local | remote);
            (payload-scrambler | no-payload-scrambler);
            start-end-flag value;
        }
        encapsulation type;
        fastether-options {
            (loopback | no-loopback);
            source-address-filter {
                mac-address;
            }
            (source-filtering | no-source-filtering);
        }
        gigether-options {
            flow-control;
            (loopback | no-loopback);
            source-address-filter {
                mac-address;
            }
            (source-filtering | no-source-filtering);
        }
        hold-time seconds;
        link-mode mode;
        mac mac-address;
        mtu bytes;
        no-keepalives;
        no-traps;
        receive-bucket {
            overflow (tag | discard);
            rate speed;
            threshold number;
        }
```

FIGURE 13a

```
sonet-options (
    aps (
        advertise-interval milliseconds;
        authentication-key key;
        force;
        hold-time milliseconds;
        lockout;
        neighbor address;
        paired-group group-name;
        protect-circuit group-name;
        request;
        revert-time seconds;
        working-circuit group-name;
    }
    bytes (
        e1-quiet value;
        f1 value;
        f2 value;
        s1 value;
        z3 value;
        z4 value;
    }
    fcs (32 | 16);
    loopback (local | remote);
    path-trace trace-string;
    (payload-scrambler | no-payload-scrambler);
    rfc-2615;
    (z0-increment | no-z0-increment);
}
speed (10m | 100m);
t1-options (
    buildout (0-133 | 133-266 | 266-399 | 399-532 | 532-655);
    byte-encoding (nx64 | nx56);
    fcs (32 | 16);
    framing (sf | esf);
    idle-cycle-flags (flags | ones);
    invert-data;
    line-encoding (ami | b8zs);
    loopback (local | remote);
    start-end-flag (shared | filler);
    timeslots slot-number;
}
t3-options (
    bert-algorithm algorithm;
    bert-error-rate rate;
    bert-period seconds;
    (cbit-parity | no-cbit-parity);
    compatibility-mode (digital-link | kentrox | larscom) <subrate value>;
    fcs (32 | 16);
    (feac-loop-respond | no-feac-loop-respond);
    idle-cycle-flag value;
    (long-buildout | no-long-buildout);
    loopback (local | remote);
    (payload-scrambler | no-payload-scrambler);
    start-end-flag value;
}
traceoptions (
    flag flag <flag-modifier> <disable>;
}
transmit-bucket (
    overflow (tag | discard);
    rate speed;
```

FIGURE 13b

```
        threshold number;
}
vlan-tagging;
unit logical-unit-number {
    disable;
    dlci identifier;
    encapsulation type;
    inverse-arp;
    multicast-dlci dlci-identifier;
    multicast-vci vpi-identifier.vci-identifier;
    multipoint;
    no-traps;
    oam-liveness {
        up-count cells;
        down-count cells;
    }
    oam-period seconds;
    point-to-point;
    shaping {
        (cbr rate | vbr peak rate sustained rate burst length);
        queue-length number;
    }
    tunnel {
        source address;
        destination address;
        ttl number;
    }
    vci vpi-identifier.vci-identifier;
    vlan-id number;
    family family {
        filter {
            input filter-name;
            output filter-name;
            group filter-group-number;
        }
        mtu size;
        multicasts-only;
        no-redirects;
        primary;
        address address {
            arp ip-address mac mac-address <publish>;
            destination address;
            broadcast address;
            multipoint-destination destination-address (dlci dlci-identifier | vci vci-identifier);
            multipoint-destination destination-address {
                inverse-arp;
                oam-liveness {
                    up-count cells;
                    down-count cells;
                }
                oam-period seconds;
                shaping {
                    (cbr rate | vbr peak rate sustained rate burst length);
                    queue-length number;
                }
                vci vpi-identifier.vci-identifier;
            }
            primary;
            preferred;
```

FIGURE 13c

```
vrrp-group group-number {
    virtual-address [ addresses ];
    priority number;
    advertise-interval seconds;
    authentication-type authentication;
    authentication-key key;
    (preempt | no-preempt);
    track {
        interface interface-name priority-cost cost;
    }
          }
      }
     }
    }
   }
  }
 } # End of [edit interfaces] hierarchy level
```

FIGURE 13d

*[edit policy-options] Hierarchy Level*

```
policy-options {
    as-path name regular-expression;
    community name members [ community-ids ];
    damping name {
        disable;
        half-life minutes;
        max-suppress minutes;
        reuse number;
        suppress number;
    }
    policy-statement policy-name {
        term term-name {
            from {
                match-conditions;
                route-filter destination-prefix match-type <actions>;
                prefix-list name;
            }
            to {
                match-conditions;
            }
            then actions;
        }
    }
    prefix-list name {
        ip-addresses;
    }
} # End of [edit policy-options] hierarchy level
```

FIGURE 14

*[edit protocols] Hierarchy Level*

```
protocols {

BGP     bgp {
            advertise-inactive;
            authentication-key key;
            cluster cluster-identifier;
            damping;
            description text-description;
            disable;
            export [policy-name];
```

FIGURE 15a

```
family inet {
   (any | unicast | multicast) {
      prefix-limit {
         maximum number;
         teardown <percentage>;
      }
   }
}
hold-time seconds;
import [policy-name];
keep (all | none);
local-address address;
local-as autonomous-system <private>;
local-preference local-preference;
log-updown;
metric-out metric;
multihop <ttl-value>;
no-aggregator-id;
no-client-reflect;
out-delay seconds;
passive;
path-selection (cisco-non-deterministic | always-compare-med);
peer-as autonomous-system;
preference preference;
remove-private;
traceoptions {
   file name <replace> <size size> <files number> <no-stamp>
      <(world-readable | no-world-readable)>;
   flag flag <flag-modifier> <disable>;
}
group group-name {
   advertise-inactive;
   allow [network/masklen];
   authentication-key key;
   cluster cluster-identifier;
   damping;
   description text-description;
   export [policy-name];
   family inet {
      (any | unicast | multicast) {
         prefix-limit {
            maximum number;
            teardown <percentage>;
         }
      }
   }
   hold-time seconds;
   import [policy-name];
   keep (all | none);
   local-address address;
   local-as autonomous-system <private>;
   local-preference local-preference;
   log-updown;
   metric-out metric;
   multihop <ttl-value>;
   multipath;
   no-aggregator-id;
   no-client-reflect;
   out-delay seconds;
   passive;
   peer-as autonomous-system;
```

FIGURE 15b

```
            preference preference;
            protocol protocol;
            remove-private;
            traceoptions {
                file name <replace> <size size> <files number> <no-stamp>
                    <(world-readable | no-world-readable)>;
                flag flag <flag-modifier> <disable>;
            }
            type type;
            neighbor address {
                advertise-inactive;
                authentication-key key;
                cluster cluster-identifier;
                damping;
                description text-description;
                export [policy-name];
                family inet {
                    (any | unicast | multicast) {
                        prefix-limit {
                            maximum number;
                            teardown <percentage>;
                        }
                    }
                }
                hold-time seconds;
                import policy-name;
                keep (all | none);
                local-address address;
                local-as autonomous-system <private>;
                local-preference local-preference;
                log-updown;
                metric-out metric;
                multihop <ttl-value>;
                multipath;
                no-aggregator-id;
                no-client-reflect;
                out-delay seconds;
                passive;
                peer-as autonomous-system;
                preference preference;
                protocol protocol;
                traceoptions {
                    file name <replace> <size size> <files number> <no-stamp>
                        <(world-readable | no-world-readable)>;
                    flag flag <flag-modifier> <disable>;
                }
            }
        }
    }
} # End of [edit protocols bgp] hierarchy level
```

FIGURE 15c

```
Connections    connections {
                   interface-switch connection-name {
                       interface interface-name.unit-number;
                       interface interface-name.unit-number;
                   }
                   lsp-switch connection-name {
                       transmit-lsp label-switched-path;
                       receive-lsp label-switched-path;
                   }
                   remote-interface-switch connection-name {
                       interface interface-name.unit-number;
                       transmit-lsp label-switched-path;
                       receive-lsp label-switched-path;
                   }
               }  # End of [edit protocols connections] hierarchy level DVMRP          dvmrp {
                   disable;
                   export [ policy-names ];
                   import [ policy-names ];
                   rib-group group-name;
                   traceoptions {
                       file name <replace> <size size> <files number> <no-stamp>
                           <(world-readable | no-world-readable)>;
                       flag flag <flag-modifier> <disable>;
                   }
                   interface interface-name {
                       disable;
                       hold-time seconds;
                       metric metric;
                   }
               }  # End of [edit protocols dvmrp] hierarchy level IGMP           igmp {
                   traceoptions {
                       file name <replace> <size size> <files number> <no-stamp>
                           <(world-readable | no-world-readable)>;
                       flag flag <flag-modifier> <disable>;
                   }
                   query-interval seconds;
                   query-last-member-interval seconds;
                   query-response-interval seconds;
                   robust-count seconds;
                   interface interface-name {
                       disable;
                       version seconds;
                   }
               }  # End of [edit protocols igmp] hierarchy level IS-IS          isis {
                   disable;
                   authentication-key key;
                   authentication-type authentication;
                   export [ policy-names ];
                   level level-number {
                       authentication-key key;
                       authentication-type authentication;
                       external-preference preference;
                       preference preference;
                       wide-metrics-only;
                   }
```

FIGURE 15d

```
            lsp-lifetime seconds;
            no-authentication-check;
            overload <timeout seconds>;
            reference-bandwidth reference-bandwidth;
            traffic-engineering {
                disable;
                shortcuts;
            }
            traceoptions {
                file name <replace> <size size> <files number> <no-stamp>
                    <(world-readable | no-world-readable)>;
                flag flag <flag-modifier> <disable>;
            }
            interface interface-name {
                disable;
                csnp-interval seconds;
                hello-authentication-key key;
                hello-authentication-type authentication;
                lsp-interval milliseconds;
                mesh-group (value | blocked);
                passive;
                level level-number {
                    disable;
                    hello-authentication-key key;
                    hello-authentication-type authentication;
                    hello-interval seconds;
                    hold-time seconds;
                    metric metric;
                    passive;
                    priority priority;
                    te-metric metric;
                }
            }
        } # End of [edit protocols isis] hierarchy level
```

LDP
```
        ldp {
            interface interface-name {
                disable;
                hello-interval seconds;
                hold-time seconds;
            }
            keepalive-interval seconds;
            keepalive-timeout seconds;
            preference preference;
            traceoptions {
                file name <replace> <size size> <files number> <no-stamp>
                    <(world-readable | no-world-readable)>;
                flag flag <flag-modifier> <disable>;
            }
        } # End of [edit protocols ldp] hierarchy level
```

MPLS
```
        mpls {
            disable;
            no-propagate-ttl;
            admin-groups {
                group-name group-value;
            }
            log-updown {
                (syslog | no-syslog);
                (trap | no-trap);
            }
```

FIGURE 15e

```
optimize-aggressive;
path path-name {
   disable;
   address <strict | loose>;
}
statistics {
   file filename size size files number <no-stamp>;
   interval seconds;
}
traceoptions {
   file name <replace> <size size> <files number> <no-stamp>
      <(world-readable | no-world-readable)>;
   flag flag <flag-modifier> <disable>;
}
traffic-engineering (bgp | bgp-igp);
label-switched-path lsp-path-name {
   disable;
   to address;
   from address;
   adaptive;
   admin-group {
      include [ group-names ];
      exclude [ group-names ];
   }
   bandwidth bps;
   class-of-service class-of-service;
   fast-reroute {
      bandwidth bps;
      hop-limit number;
      include group-names;
      exclude group-names;
   }
   hop-limit number;
   ldp-tunneling;
   metric metric;
   no-cspf;
   no-decrement-ttl;
   optimize-timer seconds;
   preference preference;
   priority setup-priority hold-priority;
   (random | least-fill | most-fill);
   (record | no-record);
   retry-limit number;
   retry-timer seconds;
   standby;
   primary path-name {
      adaptive;
      admin-group {
         include [ group-names ];
         exclude [ group-names ];
      }
      bandwidth bps;
      class-of-service class-of-service;
      hop-limit number;
      no-cspf;
      optimize-timer seconds;
      preference preference;
      priority setup-priority hold-priority;
      (record | no-record);
      standby;
   }
```

FIGURE 15f

```
            secondary path-name {
                adaptive;
                admin-group {
                    include group-names;
                    exclude group-names;
                }
                bandwidth bps;
                class-of-service class-of-service;
                hop-limit number;
                no-cspf;
                optimize-timer seconds;
                preference preference;
                priority setup-priority hold-priority;
                (record | no-record);
                standby;
            }
            install {
                destination-prefix/prefix-length <active>;
            }
        }
        interface (interface-name | all) {
            disable;
            admin-group {
                group-name;
            }
            label-map in-label {
                (nexthop (address | interface-name | address/interface-name)) | (reject | discard);
                (pop | (swap <out-label>);
                class-of-service class-of-service;
                preference preference;
                type type;
            }
        }
        static-path inet {
            prefix {
                nexthop (address | interface-name | address/interface-name);
                push out-label;
                class-of-service class-of-service;
                preference preference;
            }
        }
    } # End of [edit protocols mpls] hierarchy level
```

MSDP
```
    msdp {
        disable;
        export [ policy-names ];
        import [ policy-names ];
        rib-group group-name;
        traceoptions {
            file name <replace> <size size> <files number> <no-stamp>
                <(world-readable | no-world-readable)>;
            flag flag <flag-modifier> <disable>;
        }
        peer address {
            disable;
            local-address address;
            export [ policy-names ];
            import [ policy-names ];
            traceoptions {
                file name <replace> <size size> <files number> <no-stamp>
                    <(world-readable | no-world-readable)>;
```

FIGURE 15g

```
                    flag flag <flag-modifier> <disable>;
                }
            }
            group group-name {
                disable;
                export [ policy-names ],
                import [ policy-names ];
                local-address address;
                traceoptions {
                    file name <replace> <size size> <files number> <no-stamp>
                        <(world-readable | no-world-readable)>;
                    flag flag <flag-modifier> <disable>;
                }
                peer address; {
                    disable;
                    export [ policy-names ];
                    import [ policy-names ];
                    local-address address;
                    mode <(mesh-group | standard)>;
                    traceoptions {
                        file name <replace> <size size> <files number> <no-stamp>
                            <(world-readable | no-world-readable)>;
                        flag flag <flag-modifier> <disable>;
                    }
                }
            }
        } #End of [edit protocols msdp] hierarchy level OSPF    ospf {
            disable;
            export [ policy-names ];
            external-preference preference;
            preference preference;
            reference-bandwidth reference-bandwidth;
            traffic-engineering {
                no-topology;
                shortcuts;
            }
            traceoptions {
                file name <replace> <size size> <files number> <no-stamp>
                    <(world-readable | no-world-readable)>;
                flag flag <flag-modifier> <disable>;
            }
            area area-id {
                area-range network/masklen <restrict>;
                authentication-type authentication;
                interface interface-name {
                    disable;
                    authentication-key key <key-id identifier>;
                    dead-interval seconds;
                    hello-interval seconds;
                    interface-type type;
                    metric metric;
                    neighbor address <eligible>;
                    passive;
                    poll-interval seconds;
                    priority priority;
                    retransmit-interval seconds;
                    transit-delay seconds;
                    transmit-interval seconds;
                }
```

FIGURE 15h

```
                    nssa {
                       area-range network/masklen <restrict>;
                       default-metric metric;
                       (summaries | no-summaries);
                    }
                    stub <default-metric metric> <(summaries | no-summaries)>;
                    virtual-link neighbor-id router-id transit-area area-id {
                       disable;
                       authentication-key key <key-id identifier>;
                       dead-interval seconds;
                       hello-interval seconds;
                       retransmit-interval seconds;
                       transit-delay seconds;
                    }
                 }
              }
           } # End of [edit protocols ospf] hierarchy level PIM       pim {
             disable;
             dense-groups {
                addresses;
             }
             rib-group group-name;
             traceoptions {
                file name <replace> <size size> <files number> <no-stamp>
                   <(world-readable | no-world-readable)>;
                flag flag <flag-modifier> <disable>;
             }
             interface interface-name {
                disable;
                mode (dense | sparse | sparse-dense);
                priority number;
                version version;
             }
             rp {
                local {
                   disable;
                   address address;
                   group-ranges {
                      destination-mask;
                   }
                   hold-time seconds;
                   priority number;
                }
                auto-rp (announce | discovery | mapping);
                bootstrap-priority number;
                static {
                   address address {
                      version version;
                      group-ranges {
                         destination-mask;
                      }
                   }
                }
             }
          } # End of [edit protocols pim] hierarchy level RIP       rip {
             traceoptions {
                file name <replace> <size size> <files number> <no-stamp>
                   <(world-readable | no-world-readable)>;
```

FIGURE 15i

```
                    flag flag <flag-modifier> <disable>;
                }
                authentication-key password;
                authentication-type type;
                (check-zero | no-check-zero);
                import (policy);
                message-size number;
                metric-in metric;
                receive receive-options;
                send send-options;
                group group-name {
                    export (policy);
                    metric-out metric;
                    preference preference;
                    neighbor neighbor-name {
                        authentication-key password;
                        authentication-type type;
                        (check-zero | no-check-zero);
                        import (policy);
                        message-size number;
                        metric-in metric;
                        receive receive-options;
                        send send-options;
                    }
                }
            }  # End of [edit protocols rip] hierarchy level
```

Router Discovery
```
            router-discovery {
                disable;
                traceoptions {
                    file name <replace> <size size> <files number> <no-stamp>
                        <(world-readable | no-world-readable)>;
                    flag flag <flag-modifier> <disable>;
                }
                interface interface-name {
                    min-advertisement-interval seconds;
                    max-advertisement-interval seconds;
                    lifetime seconds;
                }
                address address {
                    (advertise | ignore);
                    (broadcast | multicast);
                    (priority priority | ineligible);
                }
            }  # End of [edit protocols router-discovery] hierarchy level
```

RSVP
```
            rsvp {
                disable;
                keep-multiplier number;
                refresh-time seconds;
                traceoptions {
                    file name <replace> <size size> <files number> <no-stamp>
                        <(world-readable | no-world-readable)>;
                    flag flag <flag-modifier> <disable>;
                }
                interface interface-name {
                    disable;
                    (aggregate | no-aggregate);
                    authentication-key key;
                    bandwidth bps;
```

FIGURE 15j

```
              hello-interval seconds;
              subscription percentage;
           }
        } # End of [edit protocols rsvp] hierarchy level SDP/SAP    sap (
              disable;
              listen <address> <port port>;
           } # End of [edit protocols sap] hierarchy level VRRP       traceoptions [
              flag flag;
           } # End of [edit protocols vrrp] hierarchy level } # End of [edit protocols] hierarchy level
```

FIGURE 15k

*[edit routing-instances] Hierarchy Level*

```
[edit]
routing-instances routing-instance-name {
   interface interface-name;
   protocols {
      ospf {
         ospf-configuration;
      }
   }
   routing-options {
      aggregate {
         defaults {
            (active | passive);
            as-path <as-path> <origin (egp | igp | incomplete | none)> <atomic-aggregate>
               <aggregator as-number in-address>;
            community ([ community-ids ] | no-advertise | no-export | no-export-subconfed | none);
            (full | brief);
            (metric | metric2 | metric3 | metric4) value;
            (preference | preference2 | color | color2) preference;
            (tag | tag2) string;
         }
         autonomous-system autonomous-system <loops number>;
         confederation confederation-autonomous-system members autonomous-system;
         fate-sharing {
            group group-name;
            cost value;
            from address [to address];
         }
         forwarding-table {
            export [ policy-names ];
         }
         generate {
            defaults {
               (active | passive);
               as-path <as-path> <origin (egp | igp | incomplete | none)> <atomic-aggregate>
                  <aggregator as-number in-address>;
               community ([ community-ids ] | no-advertise | no-export | no-export-subconfed | none);
               (full | brief);
               (metric | metric2 | metric3 | metric4) value;
               (preference | preference2 | color | color2) preference;
               (tag | tag2) string;
            }
```

FIGURE 16a

```
interface-routes {
    rib-group routing-table-name;
}
martians {
    destination-prefix match-type <allow>;
}
multicast {
    scope scope-name {
        interface interface-name;
        prefix destination-prefix;
    }
}
options {
    syslog (level level | upto level);
}
rib routing-table {
    aggregate {
        defaults {
            (active | passive);
            as-path <as-path> <origin (egp | igp | incomplete | none)> <atomic-aggregate>
                <aggregator as-number in-address>;
            community ([ community-ids ] | no-advertise | no-export | no-export-subconfed | none);
            (full | brief);
            (metric | metric2 | metric3 | metric4) value;
            (preference | preference2 | color | color2) preference;
            (tag | tag2) string;
        }
        route destination-prefix {
            policy policy-name;
            (active | passive);
            as-path <as-path> <origin (egp | igp | incomplete | none)> <atomic-aggregate>
                <aggregator as-number in-address>;
            community ([ community-ids ] | no-advertise | no-export | no-export-subconfed | none);
            (full | brief);
            (metric | metric2 | metric3 | metric4) value;
            (preference | preference2 | color | color2) preference;
            (tag | tag2) string;
        }
    generate {
        defaults {
            (active | passive);
            as-path <as-path> <origin (egp | igp | incomplete | none)> <atomic-aggregate>
                <aggregator as-number in-address>;
            community ([ community-ids ] | no-advertise | no-export | no-export-subconfed | none);
            (full | brief);
            (metric | metric2 | metric3 | metric4) value;
            (preference | preference2 | color | color2) preference;
            (tag | tag2) string;
        }
    martians {
        destination-prefix match-type <allow>;
    }
```

FIGURE 16b

```
            static {
              defaults {
                (active | passive);
                as-path <as-path> <origin (egp | igp | incomplete | none)> <atomic-aggregate>
                    <aggregator as-number in-address>;
                community ([ community-ids ] | no-advertise | no-export | no-export-subconfed | none);
                (install | no-install);
                (metric | metric2 | metric3 | metric4) value;
                (preference | preference2 | color | color2) preference;
                (readvertise | no-readvertise);
                (no-retain | retain);
                (tag | tag2) string;
              }
              route destination-prefix {
                policy policy-name];
                (active | passive);
                as-path <as-path> <origin (egp | igp | incomplete | none)> <atomic-aggregate>
                    <aggregator as-number in-address>;
                community ([ community-ids ] | no-advertise | no-export | no-export-subconfed | none);
                (full | brief);
                (metric | metric2 | metric3 | metric4) value;
                (preference | preference2 | color | color2) preference;
                (tag | tag2) string;
              }
            }
          rib-groups {
            group-name {
                import-rib [ group-name ];
                export-rib group-name;
            }
          }
          route-record;
          router-id address;
          static {
            defaults {
              (active | passive);
              as-path <as-path> <origin (egp | igp | incomplete | none)> <atomic-aggregate>
                  <aggregator as-number in-address>;
              community ([ community-ids ] | no-advertise | no-export | no-export-subconfed | none);
              (install | no-install);
              (metric | metric2 | metric3 | metric4) value;
              (preference | preference2 | color | color2) preference;
              (readvertise | no-readvertise);
              (no-retain | retain);
              (tag | tag2) string;
            }
          traceoptions {
              file name <replace> <size size> <files number> <no-stamp>
                  <(world-readable | no-world-readable)>;
              flag flag <flag-modifier> <disable>;
          }
        }
```

FIGURE 16c

*[edit routing-options] Hierarchy Level*

```
routing-options {
    aggregate {
        defaults {
            (active | passive);
            as-path <as-path> <origin (egp | igp | incomplete | none)> <atomic-aggregate>
                <aggregator as-number in-address>;
            community ([ community-ids ] | no-advertise | no-export | no-export-subconfed | none);
            (full | brief);
            (metric | metric2 | metric3 | metric4) value;
            (preference | preference2 | color | color2) preference;
            (tag | tag2) string;
        }
        route destination-prefix {
            policy policy-name;
            (active | passive);
            as-path <as-path> <origin (egp | igp | incomplete | none)> <atomic-aggregate>
                <aggregator as-number in-address>;
            community ([ community-ids ] | no-advertise | no-export | no-export-subconfed | none);
            (full | brief);
            (metric | metric2 | metric3 | metric4) value;
            (preference | preference2 | color | color2) preference;
            (tag | tag2) string;
        }
    }
    autonomous-system autonomous-system <loops number>;
    confederation confederation-autonomous-system members autonomous-system;
    forwarding-table {
        export [ policy-names ];
    }
    generate {
        defaults {
            (active | passive);
            as-path <as-path> <origin (egp | igp | incomplete | none)> <atomic-aggregate>
                <aggregator as-number in-address>;
            community ([ community-ids ] | no-advertise | no-export | no-export-subconfed | none);
            (full | brief);
            (metric | metric2 | metric3 | metric4) value;
            (preference | preference2 | color | color2) preference;
            (tag | tag2) string;
        }
        route destination-prefix {
            policy policy-name;
            (active | passive);
            as-path <as-path> <origin (egp | igp | incomplete | none)> <atomic-aggregate>
                <aggregator as-number in-address>;
            community ([ community-ids ] | no-advertise | no-export | no-export-subconfed | none);
            (full | brief);
            (metric | metric2 | metric3 | metric4) value;
            (preference | preference2 | color | color2) preference,
            (tag | tag2) string;
        }
    }
    interface-routes {
        rib-group routing-table-name;
    }
    martians {
        destination-prefix match-type <allow>;
    }
}
```

FIGURE 17a

```
multicast {
  scope scope-name {
    interface interface-name;
    prefix destination-prefix;
  }
}
options {
  syslog (level level | upto level);
}
rib routing-table {
  static {
    defaults {
      (active | passive);
      as-path <as-path> <origin (egp | igp | incomplete | none)> <atomic-aggregate>
        <aggregator as-number in-address>;
      community ([ community-ids ] | no-advertise | no-export | no-export-subconfed | none);
      (install | no-install);
      (metric | metric2 | metric3 | metric4) value;
      (preference | preference2 | color | color2) preference;
      (readvertise | no-readvertise);
      (no-retain | retain);
      (tag | tag2) string;
    }
    route destination-prefix {
      next-hop;
      (active | passive);
      as-path <as-path> <origin (egp | igp | incomplete | none)> <atomic-aggregate>
        <aggregator as-number in-address>;
      community ([ community-ids ] | no-advertise | no-export | no-export-subconfed | none);
      (install | no-install);
      (metric | metric2 | metric3 | metric4) value;
      (preference | preference2 | color | color2) preference;
      (readvertise | no-readvertise);
      (no-retain | retain);
      (tag | tag2) string;
    }
  aggregate {
    defaults {
      (active | passive);
      as-path <as-path> <origin (egp | igp | incomplete | none)> <atomic-aggregate>
        <aggregator as-number in-address>;
      community ([ community-ids ] | no-advertise | no-export | no-export-subconfed | none);
      (full | brief);
      (metric | metric2 | metric3 | metric4) value;
      (preference | preference2 | color | color2) preference;
      (tag | tag2) string;
    }
    route destination-prefix {
      policy policy-name;
      (active | passive);
      as-path <as-path> <origin (egp | igp | incomplete | none)> <atomic-aggregate>
        <aggregator as-number in-address>;
      community ([ community-ids ] | no-advertise | no-export | no-export-subconfed | none);
      (full | brief);
      (metric | metric2 | metric3 | metric4) value;
      (preference | preference2 | color | color2) preference;
      (tag | tag2) string;
    }
```

FIGURE 17b

```
generate (
    defaults (
        (active | passive);
        as-path <as-path> <origin (egp | igp | incomplete | none)> <atomic-aggregate>
            <aggregator as-number in-address>;
        community (( community-ids ) | no-advertise | no-export | no-export-subconfed | none);
        (full | brief);
        (metric | metric2 | metric3 | metric4) value;
        (preference | preference2 | color | color2) preference;
        (tag | tag2) string;
    )
    route destination-prefix (
        policy policy-name;
        (active | passive);
        as-path <as-path> <origin (egp | igp | incomplete | none)> <atomic-aggregate>
            <aggregator as-number in-address>;
        community (( community-ids ) | no-advertise | no-export | no-export-subconfed | none);
        (full | brief);
        (metric | metric2 | metric3 | metric4) value;
        (preference | preference2 | color | color2) preference;
        (tag | tag2) string;
    )
)
martians (
    destination-prefix match-type <allow>;
)
)
rib-groups (
    group-name (
        import-rib [ group-name ];
        export-rib group-name;
    )
)
router-id address;
static (
    defaults (
        (active | passive);
        as-path <as-path> <origin (egp | igp | incomplete | none)> <atomic-aggregate>
            <aggregator as-number in-address>;
        community (( community-ids ) | no-advertise | no-export | no-export-subconfed | none);
        (install | no-install);
        (metric | metric2 | metric3 | metric4) value;
        (preference | preference2 | color | color2) preference;
        (readvertise | no-readvertise);
        (no-retain | retain);
        (tag | tag2) string;
    )
    route destination-prefix (
        next-hop;
        (active | passive);
        as-path <as-path> <origin (egp | igp | incomplete | none)> <atomic-aggregate>
            <aggregator as-number in-address>;
        community (( community-ids ) | no-advertise | no-export | no-export-subconfed | none),
        (install | no-install);
        (metric | metric2 | metric3 | metric4) value;
        (preference | preference2 | color | color2) preference;
        (readvertise | no-readvertise);
        (no-retain | retain);
        (tag | tag2) string;
    )
)
traceoptions (
    file name <replace> <size size> <files number> <no-stamp
        <(world-readable | no-world-readable)>;
    flag flag <flag-modifier> <disable>;
)
) # End of [edit routing-options] hierarchy level
```

FIGURE 17c

*[edit snmp] Hierarchy Level*

```
snmp {
    description description;
    location location;
    contact contact;
    interface [ interface-names ];
    community community-name {
        authorization authorization;
        clients {
            default restrict;
            address <restrict>;
        }
    }
    trap-group group-name {
        categories category;
        targets {
            address;
        }
        version version;
    }
    traceoptions {
        file <files number> <size size>;
        flag flag <disable>;
    }
}   # End of [edit snmp] hierarchy level
```

FIGURE 18

*[edit system] Hierarchy Level*

```
system {
    authentication-order [ authentication-methods ];
    backup-router address <destination destination-address>;
    compress-configuration-files;
    default-address-selection;
    dhcp-relay (server address | disable);
    diag-port-authentication (encrypted-password "password" | plain-text-password);
    domain-name domain-name;
    domain-search [domain-list];
    host-name host-name;
    location {
        altitude feet;
        country-code code;
        hcoord horizontal-coordinate;
        lata service-area;
        latitude degrees;
        longitude degrees;
        npa-nxx number;
        postal-code postal-code;
        vcoord vertical-coordinate;
    }
    login {
        message text;
        class class-name {
            allow-commands "regular-expression";
            deny-commands "regular-expression";
            idle-timeout minutes;
            permissions [ permissions ];
        }
        user user-name {
            full-name complete-name;
            uid uid-value;
            class class-name;
            authentication {
                (encrypted-password "password" | plain-text-password);
                ssh-rsa "public-key";
            }
        }
    }
    name-server {
        address;
    }
    no-redirects;
    ntp {
        authentication-key key-number type type value password;
        boot-server address;
        broadcast <address> <key key-number> <version value> <ttl value>;
        broadcast-client;
        multicast-client <address>;
        peer address <key key-number> <version value> <prefer>;
        server address <key key-number> <version value> <prefer>;
        trusted-key [ key-numbers ];
    }
    ports {
        auxiliary {
            insecure;
            speed baud-rate;
            type terminal-type;
        }
        console {
            insecure;
            speed baud-rate;
            type terminal-type;
```

FIGURE 19a

```
            )
          )
          processes {
             inet-process (enable | disable);
             interface-control (enable | disable);
             mib-process (enable | disable);
             ntp (enable | disable);

routing (enable | disable);
             snmp (enable | disable);
             watchdog (enable | disable) <timeout seconds>;
          }
          radius-server server-address {
             port number;
             retry number;
             secret password;
             timeout seconds;
          }
          root-authentication {
             (encrypted-password "password" | plain-text-password);
             ssh-rsa "public-key";
          }
          services {
             finger <connection-limit limit> <rate-limit limit>;
             ssh <connection-limit limit> <rate-limit limit>;
             telnet <connection-limit limit> <rate-limit limit>;
          }
          static-host-mapping {
             host-name {
                inet [ address ];
                sysid system-identifier;
                alias [ alias ];
             }
          }
          syslog {
             file filename {
                facility level;
                archive {
                   files number;
                   size size;
                   (world-readable | no-world-readable);
                }
             }
             host hostname {
                facility level;
                facility-override facility;
                log-prefix string;
             }
             user (username | *) {
                facility level;
             }
             console {
                facility level;
             }
             archive {
                files number;
                size size;
                (world-readable | no-world-readable),
             }
          }
          tacplus-server server-address {
             secret password;
             single-connection;
             timeout seconds;
          }
          time-zone time-zone;
       }} # End of [edit system] hierarchy level
```

FIGURE 19b

COMPARING CONFIGURATION INFORMATION FOR A DATA FORWARDING DEVICE

§ 1. BACKGROUND OF THE INVENTION

§ 1.1 Field of the Invention

The present invention concerns configuring data forwarding devices, such as routers for example. More specifically, the present invention concerns comparing candidate (or other) configuration information for such a device with previously stored (e.g., committed) configuration information.

§ 1.2 Related Art

The description of art in this section is not, and should not be interpreted to be, an admission that such art is prior art to the present invention. The present invention may be used for comparing configuration information for data forwarding devices.

Data forwarding devices, such as routers and switches, may be interconnected to form networks. The interconnections may be such that each data forwarding device has a plurality of input lines and a plurality of output lines. A basic function of these devices is to forward data received at their input lines to the appropriate output lines. Routers, for example, may determine the appropriate output lines based on a destination address(es) contained in the received data and forwarding tables. Switches may be configured so that data received at input lines are transferred out appropriate output lines.

Such data forwarding devices may need to be configured appropriately. This may be done by entering configuration commands and/or information through a keyboard or other type of interface into a data forwarding device. Other types of information or commands may also be entered into the device through the keyboard or interface.

When entering a command or information through a keyboard (or similar user interface) of a data forwarding device or editing an existing configuration, there is a risk that the command or information may be entered or edited incorrectly or incompletely. Such errors may cause the data forwarding device to be incorrectly configured and may lead to serious malfunctions.

Further, as can be appreciated from the foregoing, configuring data forwarding devices, such as routers for example, can be a complex task, often requiring networking expertise. Further, configuration information can become quite large, thereby increasing the likelihood of mistakes in configuration.

Accordingly, there is a need to reduce the risk that commands or information will be entered incorrectly or incompletely and to ensure that the edits are entered correctly.

§ 2. SUMMARY OF THE INVENTION

The disclosed invention helps users to detect errors in (candidate) configuration information by permitting the (candidate) configuration information to be compared with previously saved configuration information. Differences between the two sets of configuration information may be indicated by special characters or symbols preceding changed lines of configuration, or by special font characteristics (e.g., color, underlining, typeface, font size, font type, etc.) applied to changed versus unchanged lines or sections of the configuration.

The disclosed invention may also operate on configuration information relevant to data forwarding devices, such as routers for example. Further, some configuration information may include instructions and parameters. The disclosed invention may operate to compare only instructions, only parameters, or both.

Each of the sets of configuration information may include configuration categories. Such categories may include chassis configuration information, class-of-service configuration information, firewall configuration information, forwarding-options configuration information, groups configuration information, interfaces configuration information, policy-options configuration information, protocols configuration information, routing-instances configuration information, routing-options configuration information, network management protocol configuration information, and/or system configuration information.

For such hierarchical configuration information, the comparison may be limited to particular hierarchical levels and categories. For example, the part to be compared may be a particular hierarchical level of a particular category, and its descendant statements. If one of the sets is a candidate set of configuration information being worked on by a user, then the particular hierarchical level and particular category defining parts to be compared may correspond to that being worked on the by user. Alternatively, the user may define the hierarchical levels and/or categories to be compared.

Finally, different hierarchical levels and categories may have different permission requirements. In this way, the users permitted to access and/or edit various hierarchical levels and categories of configuration information may be limited.

§ 3. BRIEF DESCRIPTION OF THE DRAWINGS

FIG. 8 illustrates exemplary instructions and parameters for a chassis part of a set of router configuration information.

FIG. 9 illustrates exemplary instructions and parameters for a class-of-service part of a set of router configuration information.

FIG. 10 illustrates exemplary instructions and parameters for a firewall part of a set of router configuration information.

FIG. 11 illustrates exemplary instructions and parameters for a forwarding options part of a set of router configuration information.

FIG. 12 illustrates exemplary instructions and parameters for a groups part of a set of router configuration information.

FIGS. 13a-13d illustrate exemplary instructions and parameters for an interfaces part of a set of router configuration information.

FIG. 14 illustrates exemplary instructions and parameters for a policy options part of a set of router configuration information.

FIGS. 15a-15k illustrate exemplary instructions and parameters for a protocols part of a set of router configuration information.

FIGS. 16a-16c illustrate exemplary instructions and parameters for a routing-instances part of a set of router configuration information.

FIGS. 17a-17c illustrate exemplary instructions and parameters for a routing-options part of a set of router configuration information.

FIG. 18 illustrates exemplary instructions and parameters for a simple network management protocol part of a set of router configuration information.

FIGS. 19a and 19b illustrate exemplary instructions and parameters for a system part of a set of router configuration information.

§ 4. DETAILED DESCRIPTION

The present invention involves novel methods, apparatus and data structures for comparing at least a part of sets of configuration information, such as configuration information of a router, or hierarchical configuration information. The following description is presented to enable one skilled in the art to make and use the invention, and is provided in the context of particular applications and their requirements. Various modifications to the disclosed embodiments will be apparent to those skilled in the art, and the general principles set forth below may be applied to other embodiments and applications. Thus, the present invention is not intended to be limited to the embodiments shown and the inventor regards his invention as the following disclosed methods, apparatus and data structures and any other patentable subject matter.

§ 4.1 Environments in which the Present Invention may Operate

Various aspects of the present invention may use configuration information, such as that used by data forwarding devices (e.g., routers). Two exemplary data forwarding devices are described below.

§ 4.1.1 First Exemplary Data Forwarding Device

Figure 1:
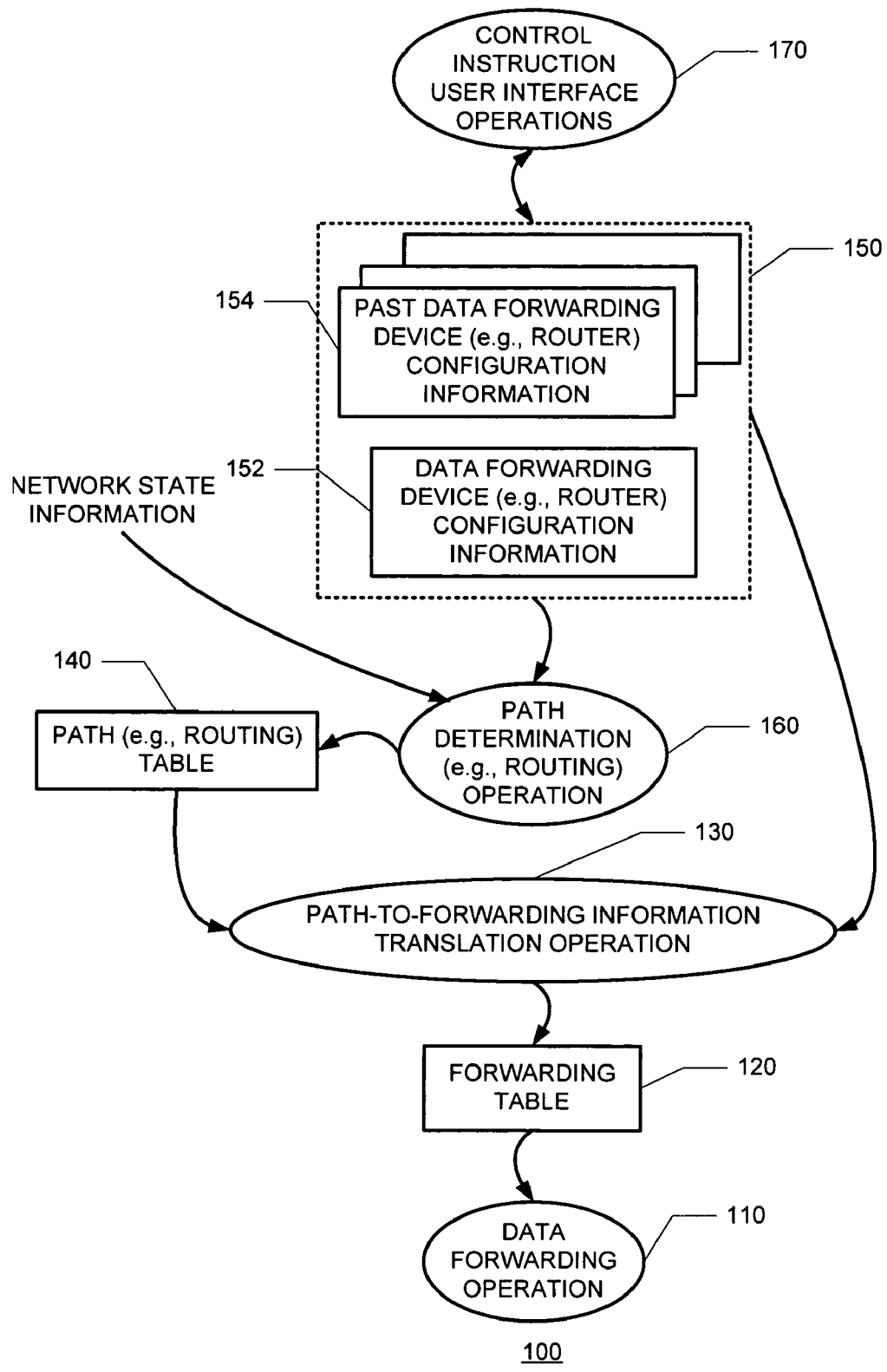
FIG. 1 is a high-level bubble chart diagram of a simple exemplary data forwarding device having configuration information on which the present invention may operate.

FIG. 1 is a high-level bubble chart diagram of a simple exemplary data forwarding device 100 having configuration information 150 on which the present invention may operate. As shown, a data forwarding operation 110 may use information in a forwarding table 120 to forward incoming data (e.g., packets) towards a final destination. The forwarding table 120 may be generated and updated by a path-to-forwarding information translation operation 130. The path-to-forwarding information translation operation 130 may perform its generation and update functions based on a path (e.g., routing) table 140 and device configuration information 152. The path (e.g., routing) table 140 may be generated by a path (e.g., route) determination operation 160 based on network state (e.g., link state) information, as well as device configuration information 152. For example, the path determination operation 160 may operate in accordance with known routing protocols to populate a routing table.

A control instruction user interface operation 170 may be used for, among other things, generating, importing, and/or editing the device configuration information 152. The present invention may concern at least a part of the control instruction user interface operation 170.

§ 4.1.2 Second Exemplary Data Forwarding Device

Figure 2:
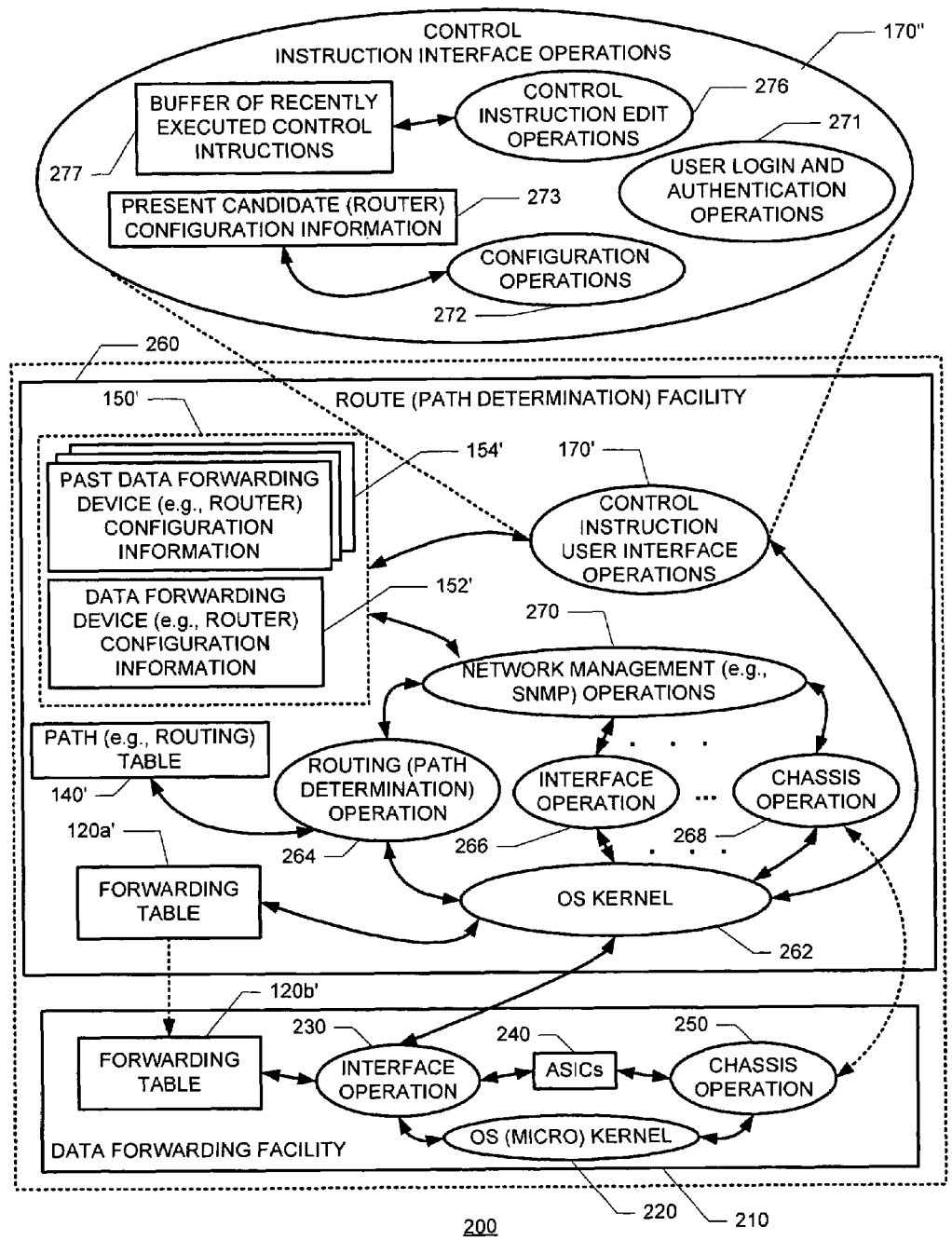
FIG. 2 is a high-level bubble chart diagram of an exemplary data forwarding device having configuration information on which the present invention may operate.

FIG. 2 is a high-level bubble chart diagram of an exemplary data forwarding device 200 having configuration information 150' on which the present invention may operate. The data forwarding device 200 may include a data (e.g., packet) forwarding facility 210 and a path (e.g., route) determination facility 260. Basically, the data forwarding facility 210 may function to forward data towards its ultimate destination, and the path determination facility 260 may function to generate and/or update a forwarding table 120' based on path (e.g., route) determinations.

In an exemplary embodiment, the data forwarding facility 210 may include an operating system (micro) kernel 220 which supports various operations (e.g., an interface operation 230 and a chassis operation 250). The exemplary data forwarding facility 210 may also include an instance of a forwarding table 120b' used to forward data towards its destination. The forwarding table instance 120b' may correspond to an instance of the forwarding table 120a' of the path determination facility 260.

In an exemplary embodiment, the path determination facility 260 may include an operating system kernel 262 which supports various operations (e.g., a path (e.g., route) determination operation 264, an interface operation 266, a chassis operation 268, control instruction user interface operations 170', etc.) and which may be used to generate the forwarding table instance 120a'. The path (e.g., route) determination operation 264 may be used to determine a path (e.g., routing) table 140'. Network management (e.g., SNMP) operations 270 may interact with the various operations 264,266,268 supported by the operating system kernel 262. The control instruction user interface operation 170' may act on configuration information 150' in accordance with the present invention.

As shown in the blow-up of bubble 170' in FIG. 2, the control instruction user interface operations 170' may include user login and authentication operations 271, configuration operations 272 and control instruction editing operations 276 (which may access recently executed control instructions stored in the buffer 277). As will be appreciated from the description of the present invention, the configuration operation 272 may operate on present candidate configuration information 273.

In both the device 100 of FIG. 1 and the device 200 of FIG. 2, control instruction user interface operations 170 and 170', respectively, may interact with device configuration information 150 and 150', respectively. The present invention may constitute a part of such control user interface operations 170/170'. The present invention may be used with other data forwarding devices.

§ 4.2 Functions that may be Performed by the Present Invention

A data forwarding device (referred to below as a "router", without loss of generality) may be provided with default configuration information to permit its components to interoperate properly. Users may want to change such default configuration information, for example, to optimize the router for a particular intended use, to have the router operate properly within a given network, to use the router with various physical communications media, etc.

A routing protocol operation may be used to control the routing protocols that run on a router. Such an operation may start all configured routing protocols and handle all routing messages. This operation may maintain one or more routing tables, which may consolidate, into common tables, routing information learned from a plurality of protocols. A user may configure the router to control the routes that a protocol places into each table and the routes from that table that the protocol advertises. This may be done be defining one or more routing policies and then applying such policies to the specific routing protocol.

From this routing information, the routing protocol operation may determine the active routes to network destinations and may install these routes into a forwarding table. Finally, the routing protocol operation may implement a routing policy, which a user may use to control routing information transferred between routing protocols and the routing table (i.e., information may be filtered (e.g., using firewalls) so that only some of it is transferred, and properties associated with routes may be set).

A user may also configure and control physical interface devices and logical interfaces in a router. For example, the user may configure various interface properties such as the interface location, interface encapsulation, and interface-specific properties.

Further, a user may configure and control chassis-related properties of a router, such as conditions that trigger alarms and clock sources.

The present invention may function to help users to detect errors in (candidate) configuration information by permitting the (candidate) configuration information (e.g., of data forwarding devices such as routers) to be compared with a previously saved configuration information. Differences between at least a part of the two sets of configuration information may be indicated by special characters or symbols preceding changed lines of configuration information, or by special font characteristics (e.g., color, underlining, typeface, font size, font type, etc.) applied to changed versus unchanged lines (or "statements") or sections of the configuration information.

The present invention may further help users to detect errors in candidate configuration information by applying "scoping" functionality, so that in the context of a hierarchical configuration, only relevant or selected parts of a set of candidate configuration information and a previously saved set of configuration information are compared. Different hierarchical levels and/or categories of configuration information may be stored as different objects in an object-oriented database. The present invention may limit permissions to view or change different hierarchical levels and/or categories of configuration information.

Finally, the invention may further help users to detect errors in (candidate) configuration information by comparing only instructions, only parameters, or both.

§ 4.3 Exemplary Operations, Architecture, Methods and Data Structures

Operations that may be performed by the present invention, exemplary methods and data structures that may be used to effect such operations, and exemplary hardware that may be used to effect such operations are described below.

§ 4.3.1 Exemplary Operations

Figure 3:
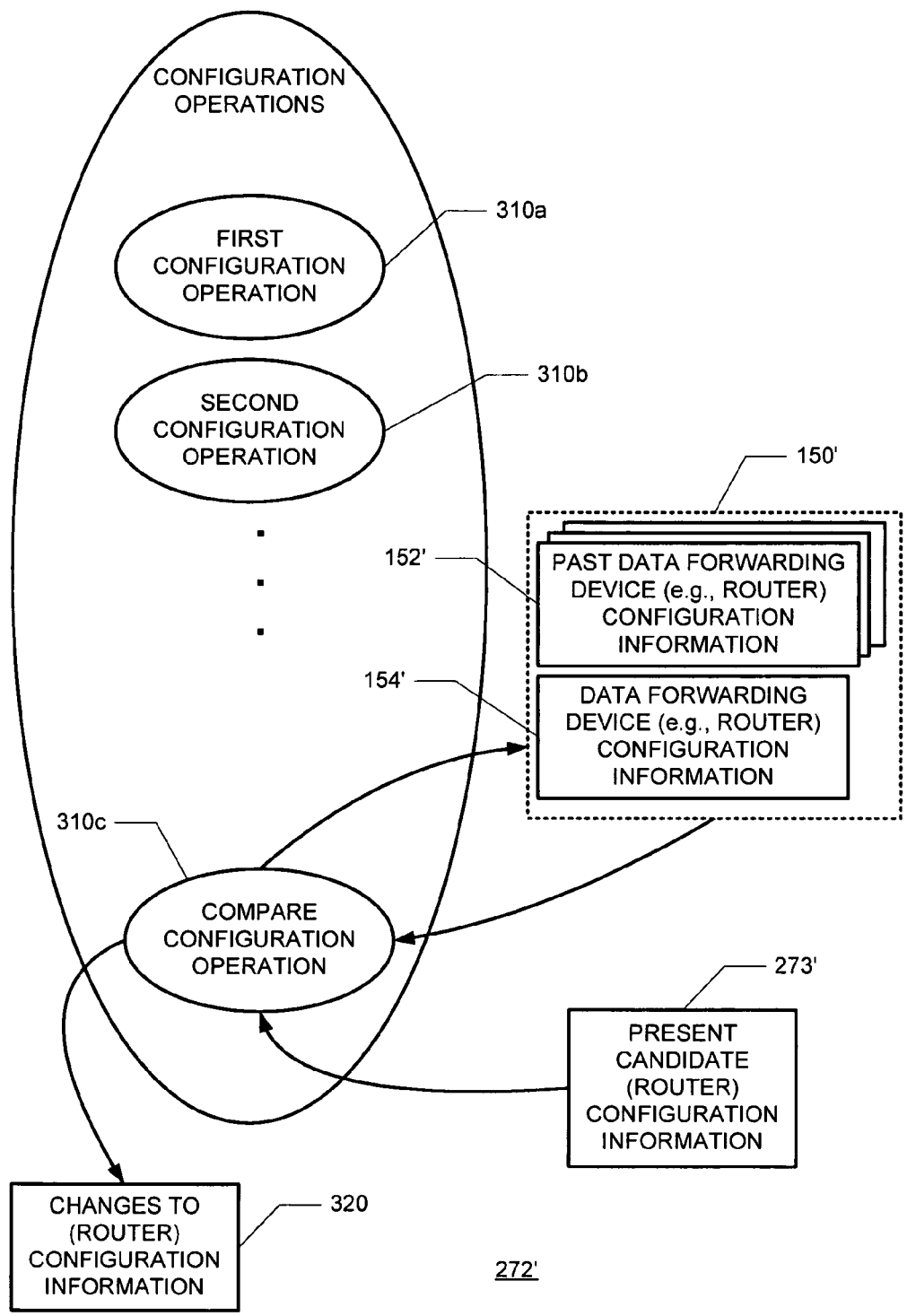
FIG. 3 is a high-level bubble chart diagram of exemplary configuration operations that may take place in the device of FIG. 1, or the device of FIG. 2.

FIG. 3 is a high-level bubble chart diagram of exemplary configuration operations 272' that may take place in a data forwarding device, such as the device of FIG. 1, or the device of FIG. 2. Notice that the configuration operations 272' may include a plurality of particular configuration operations 310. Such particular configuration operations 310 may include, for example, an ACTIVATE operation for removing an inactive tag from an instruction, an ANNOTATE operation for annotating an instruction with a comment, a COMMIT operation for committing to current candidate configuration information, a COPY operation for copying an instruction, a DEACTIVATE operation for adding an inactive tag to an instruction, a DELETE operation for deleting a data element, an EDIT operation for editing a sub-element, an EXIT operation for leaving a current hierarchical level of configuration information, a HELP operation for providing help information, an INSERT operation for inserting a new ordered data element, a LOAD operation for loading configuration information (e.g., from an ASCII file), a QUIT operation for quitting a hierarchical level of configuration information, a RENAME operation for renaming an instruction, a ROLLBACK operation for rolling back a database to a selected one of previously committed versions of configuration information, a RUN operation for running an instruction, a SAVE command for saving configuration information, a SET operation for setting a parameter, a SHOW operation for showing a parameter, a STATUS operation for displaying a user status, a TOP operation for navigating to a top hierarchical level of configuration information, and an UP operation for navigating to a next higher hierarchical level of configuration information.

As indicated by FIG. 3, the configuration operations 272' may further include a COMPARE CONFIGURATION operation 310c. Briefly stated, the COMPARE CONFIGURATION operation 310c may accept at least a part of a default set of configuration information (e.g., the last committed configuration information 152') or at least a part of a selected one of other past sets of configuration information 154' as a first input and at least a part of a set of present candidate (or other past) configuration information 273' as a second input. The COMPARE CONFIGURATION operation 310c will then generate changes 320 to the part(s) of the set of default or selected configuration information 154'/152' needed to get the corresponding part(s) of the set of (present candidate) configuration information 273'. Alternatively, the COMPARE CONFIGURATION operation may operate on at least a part of any two sets of configuration information.

If a user is in a given hierarchical level of a given category within the candidate configuration information 273', then the COMPARE CONFIGURATION operation 310c may limit its comparison to the relevant hierarchical level and its descendants, of the given category within the set of default or selected configuration information 154'/152'. Alternatively, a user may select categories and/or hierarchical levels (i.e., part(s)) of the sets of configuration information on which the COMPARE CONFIGURATION operation 310c may operate.

The changes to the default/selected configuration information may be visually indicated by special symbols preceding instructions added, removed, or changed, by special font characteristics, etc.

§ 4.3.2 Exemplary Methods and Data Structures

Figure 4:
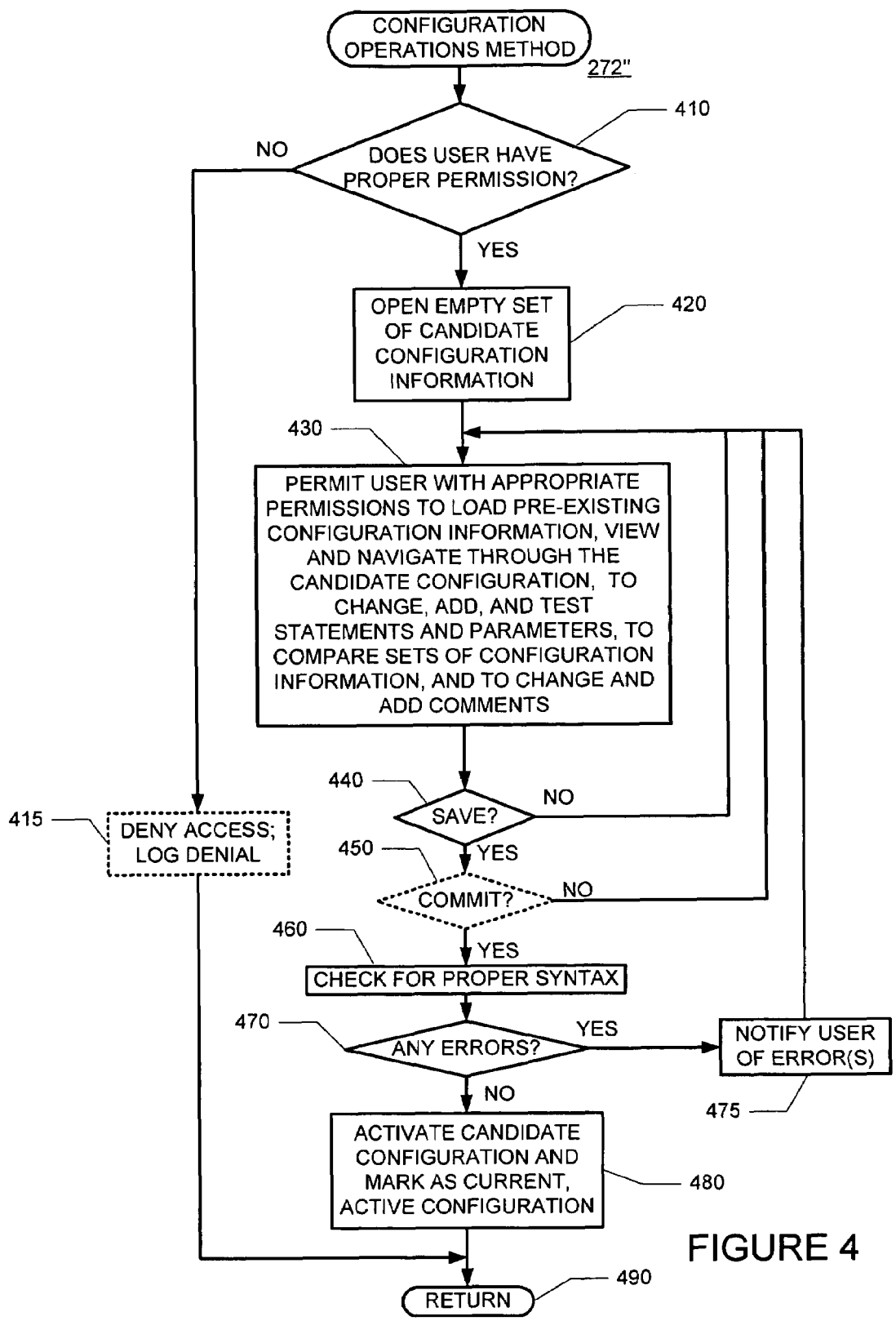
FIG. 4 is a high-level flow diagram of an exemplary method that may be used to effect at least some of the exemplary configuration operations of FIG. 3.

FIG. 4 is a high level flow diagram of an exemplary method 272" that may be used to effect at least some of the exemplary configuration operations 310 of FIG. 3. First, as indicated at conditional branch point 410, it is determined whether or not a (logged in) user has proper permission to perform any configuration operations. If not, access is denied and such denial may be flagged as indicated by optional block 415, before the method 272" is left via RETURN node 490. If, on the other hand, it is determined that the user has proper permission to perform any (i.e., at least some) configuration operations, the method 272" continues to step 420 where an empty set of candidate configuration information is opened. Then, as indicated by block 425, the user may, assuming they have the appropriate level of permission, load preexisting configuration information (Recall, e.g., the LOAD and ROLLBACK operations.), view and navigate through the candidate configuration (Recall, e.g., the EDIT, EXIT, QUIT, SHOW, TOP, and UP operations.), change instructions and/or parameters (Recall, e.g., the ACTIVATE, DEACTIVATE, DELETE, INSERT, SET, and RENAME operations.), add instructions and/or parameters (Recall, e.g., the COPY and INSERT operations.), test instructions and/or parameters (Recall, e.g., the RUN operation), and change or add comments to instructions (Recall, e.g., the ANNOTATE operation).

During such a session, the candidate configuration may be saved as indicated by decision branch point 440. In one exemplary embodiment, candidate configuration information is not used until it is committed. As shown by optional decision branch point 450, if the candidate configuration information is committed, it may be checked for proper syntax as indicated by block 460. If there are any syntactical errors, the user may be notified of such errors as indicated by decision branch point 470 and block 475, before the method 272" branches back to block 425. If, on the other hand, there are no syntactical errors, the candidate configuration information may be activated and marked or flagged as the current active configuration information, as indicated by decision branch point 470 and block 480, before the method 272" is left via RETURN node 490.

Recall from FIG. 3 and block 425 of FIG. 4 that a number of operations are made available during a configuration session. One such operation may be a "compare configuration information operation" 310c. Before describing an exemplary method for effecting a compare configuration information operation with reference to FIG. 5, exemplary data structures for storing configuration information are first described below. An appreciation of an exemplary hierarchical data structure for configuration information will be useful in understanding optional "scoping" and "permissions" aspects of the present invention.

As stated above, the set of configuration information may have, or be arranged in the context of, a hierarchy. In one exemplary configuration information data structure, the configuration information is defined by a hierarchy of statements. In this exemplary data structure, there are two types of statements—container statements and leaf statements. Container statements contain other statements, while leaf statements do not contain other statements. All of the container and leaf statements collectively define the configuration hierarchy. In this exemplary embodiment, each statement at the top level of the configuration hierarchy resides at the trunk (or root) level of a tree data structure. These top-level statements are often container statements that contain other statements that form branches of the tree data structure. The leaf statements form the leaves of the tree data structure. An individual hierarchy of statements (that starts at the trunk) may be referred to as a "statement path." Various statements and their inter-relationships may be stored as objects in an object-oriented database.

Figure 6:
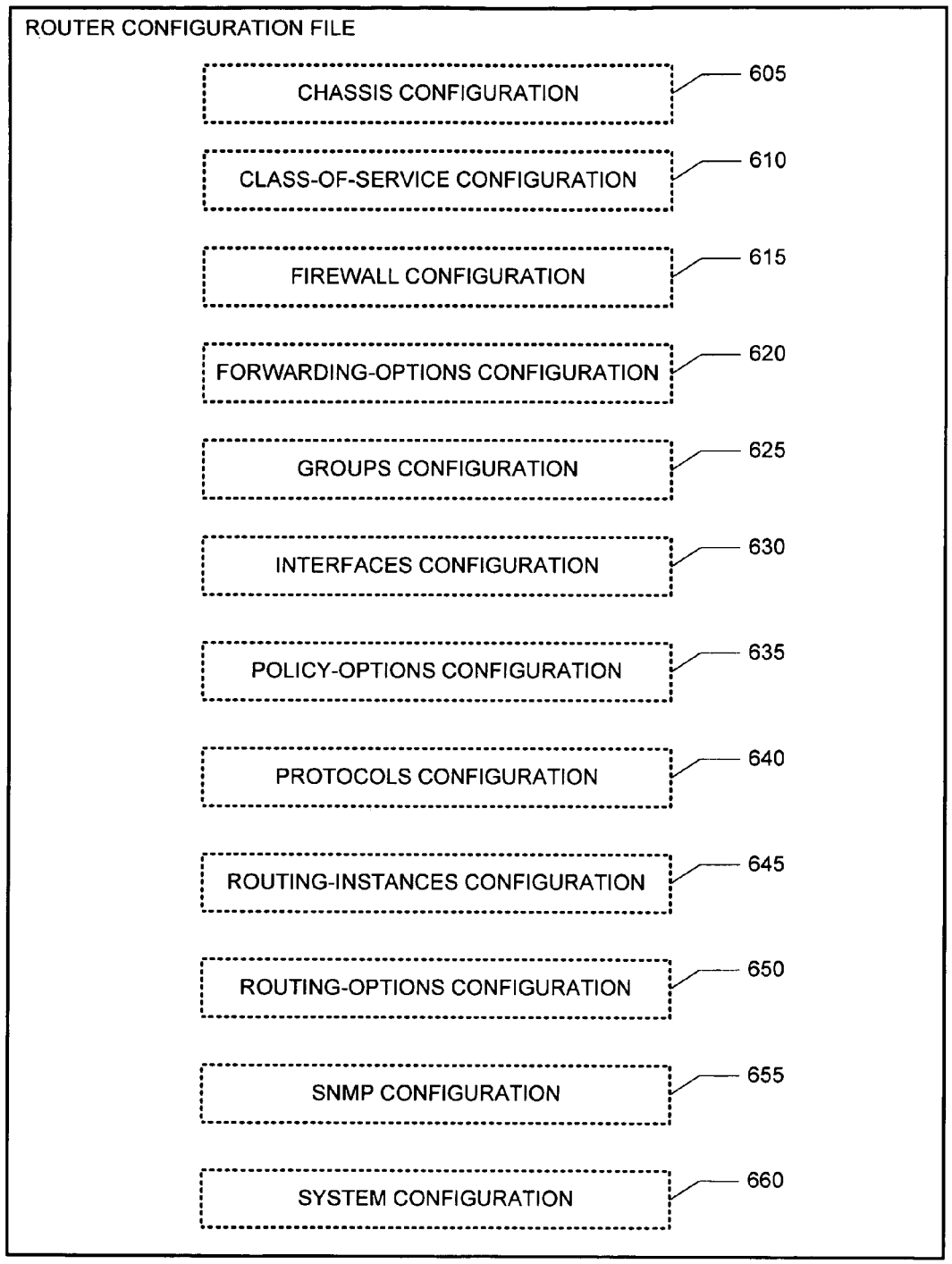
FIG. 6 is a block diagram that illustrates different types of configurations that may be used in a router configuration data structure.

Such a hierarchical data structure may be used for storing configuration information for a data forwarding device, such as a router for example. FIG. 6 illustrates exemplary container statements contained in an exemplary configuration information structure 152" for a router. As indicated, the highest level of the hierarchy may include a number of configuration categories, such as chassis configuration 605, class-of-service configuration 610, firewall configuration 615, forwarding options configuration 620, groups configuration 625, interfaces configuration 630, policy-options configuration 635, protocols configuration 640, routing instances configuration 645, routing options configuration 650, simple network management protocol (SNMP) configuration 655 and system configuration 660.

FIG. 8 illustrates exemplary statements and parameters for a chassis configuration part 605 of an exemplary router configuration 152". FIG. 9 illustrates exemplary statements and parameters for a class-of-service configuration part 610 of an exemplary router configuration 152". FIG. 10 illustrates exemplary statements and parameters for a firewall configuration part 615 of an exemplary router configuration 152". FIG. 11 illustrates exemplary statements and parameters for a forwarding options configuration part 620 of an exemplary router configuration 152". FIG. 12 illustrates exemplary statements and parameters for a groups configuration part 625 of an exemplary router configuration 152". FIG. 13, which includes FIGS. 13a through 13d, illustrates exemplary statements and parameters for an interfaces configuration part 630 of an exemplary router configuration 152". FIG. 14 illustrates exemplary statements and parameters for a policy options configuration part 635 of an exemplary router configuration 152". FIG. 15, which includes FIGS. 15a through 15k, illustrates exemplary statements and parameters for a protocols configuration part 640 of an exemplary router configuration 152". FIG. 16, which includes FIGS. 16a through 16c, illustrates exemplary statements and parameters for a routing-instances configuration part 645 of an exemplary router configuration 152". FIG. 17, which includes FIGS. 17a through 17c, illustrates exemplary statements and parameters for a routing-options configuration part 650 of an exemplary router configuration 152". FIG. 18 illustrates exemplary statements and parameters for a simple network management protocol configuration part 655 of a router configuration 152". Finally, FIG. 19 illustrates exemplary statements and parameters for a system configuration part 660 of an exemplary router configuration 152".

Figure 7:
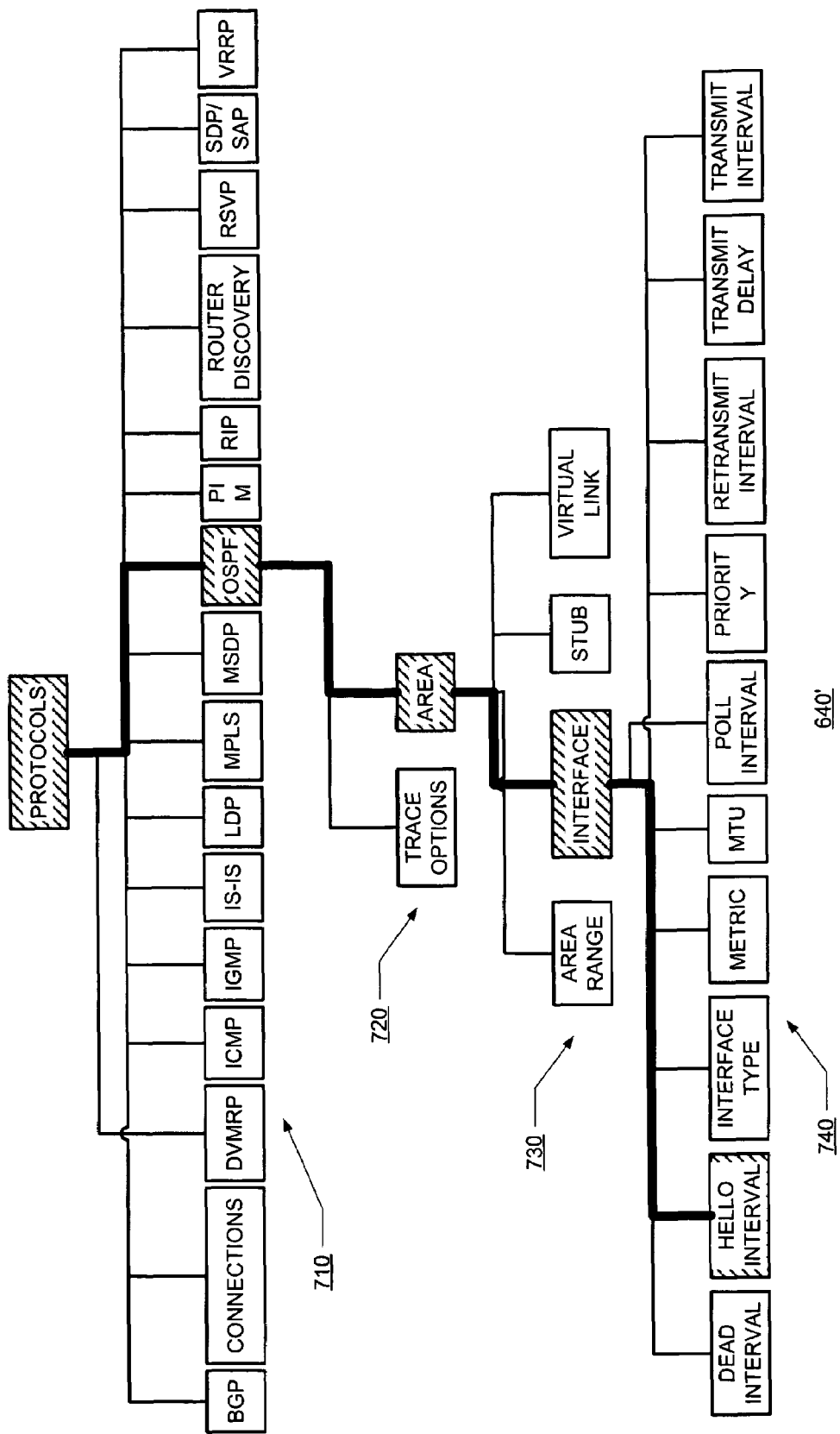
FIG. 7 illustrates an exemplary configuration hierarchy in a protocols configuration part of a set of router configuration information.

Referring now to the exemplary instructions and parameters of FIG. 15 for a protocols configuration part 640 of an exemplary router configuration 152", the following statement path:

```
protocols{
    ospf{
        area 0.0.0.0{
            interface so-0/0/0{
                hello interval 5;
            }
            interface so-0/0/1{
                hello interval 5;
            }
        }
    }
}
``` is illustrated by the tree 640' of FIG. 7.

In this example, the "protocols" statement is a top-level statement at the trunk of the configuration tree. The "ospf", "area", and "interface" statements are all subordinate container statements of a higher statement in the configuration tree (i.e., the define branches). In this case, each of the "interface" statements contain a parameter value (so-0/0/0/0 and so-0/0/1). Finally, the "hello interval" statement is a leaf on the configuration tree. In this case, each of the "hello interval" statements contain a parameter value (5) as the length of the hello interval, in seconds, for each of the defined interfaces.

This statement path is depicted with cross-hatching and bold lines in FIG. 7. As illustrated, the "hello interval" leaf statement, at a fifth hierarchical level 740, is contained in the "interface" branch container statement. The "interface" branch container statement at the fourth hierarchical level 730 is, in turn, contained in the "area" branch container statement. The "area" branch container statement at the third hierarchical level 720 is, in turn, contained in the "ospf" branch container statement. Finally, the "ospf" branch container statement at the second hierarchical level 710 is, in turn, contained in the "protocols" root container statement at the first hierarchical level.

In the configuration statements set forth above, the hierarchical levels are defined within an open brace symbol "{" and a closed brace symbol "}". If a statement at a given hierarchical level is empty (i.e., if it contains no other statement), then the braces need not be depicted. Finally, each leaf statement (or the non-leaf statement at the otherwise lowest level of the hierarchy) may be depicted with a semicolon.

Figure 5:
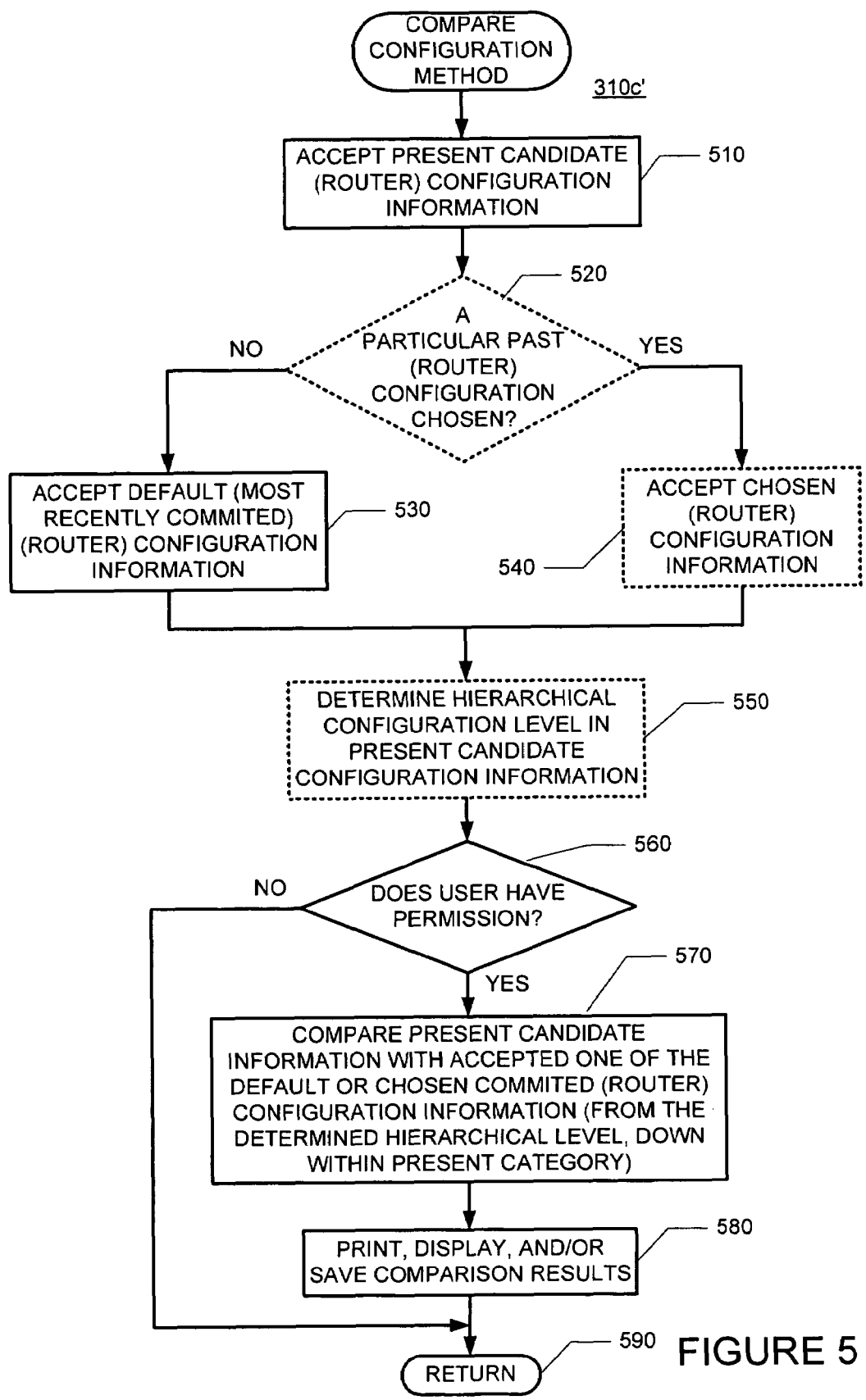
FIG. 5 is a high-level flow diagram of an exemplary method that may be used to effect a configuration compare operation in accordance with the present invention.

Having illustrated examples of hierarchical data structures for configuration information, an exemplary method 310c' that may be used to effect the compare configurations operation 310c is now presented with reference to FIG. 5. As indicated by block 510, at least a part of a set of (present candidate) (router) configuration information is accepted. As indicated by block 530, at least a part of a set of default (e.g., most recently committed) configuration information may also be accepted. Alternatively, in one embodiment as indicated by optional conditional branch point 520 and optional block 540, a user may choose (at least a part of) one of a plurality of sets of particular configuration information (e.g., one of nine stored previously committed). Thus, at least a part of two sets of configuration information are accepted at this point. In another alternative (not shown), a user can select (at least a part of) two sets of previously committed or stored configuration information.

Referring next to optional block 550, the hierarchical level of the set of candidate configuration information which the user is presently within may be determined. This may be used to scope the compare operation to the present hierarchical level and category, and it's descendants. Then, as indicated by decision branch point 560, it is determined whether or not the user has permission to perform the compare operation (at the given hierarchical level or category). If not, the method 310c' may be left via RETURN node 590. Otherwise, if the user has proper permission(s), the method 310c' continues to block 570 where the part(s) of the set of the present candidate (or other) configuration information is compared with the part(s) of the set of default or chosen committed (router) configuration information. This comparison may be effected using the UNIX "diff" command, a similar technique, or any other known comparison technique. Note that user permission may have been previously checked, in which case decision branch point 560 is redundant.

Still referring to block 570, in one embodiment, comparisons may be made as follows. First, a copy of the candidate configuration may be made. All further operations may use this "scratch" copy of the candidate configuration. Each object (e.g., hierarchical level) of the configuration may be associated with two flags: a "referenced" flag; and a "created" flag. The configuration to which the candidate (or other) configuration is to be compared may be loaded into a configuration database. As each object is loaded into the database, its "referenced" flag (and its parents, in the configuration object hierarchy) is set (e.g., to "1"). When an object's data value is set in the database, it is determined whether or not a value currently exists for that object. If so, the "created" flag is set (e.g., to "1"), and the old value is stored before being replaced with a new value. After the configuration is loaded, the selected part of the database is exported (e.g., displayed) in ASCII. As the selected part is being displayed, the two flag values are checked and are processed as indicated in the following table:

| "created" flag | "referenced" flag | Meaning | Display |
|---|---|---|---|
| 0 | 0 | Object is new in candidate configuration | Display "+" symbol |
| 0 | 1 | Object is unchanged in candidate configuration | No special display |
| 1 | 0 | Object is deleted in candidate configuration | Display "–" symbol |
| 1 | 1 | Object has new value in candidate configuration | Display "+" symbol for new value and "–" symbol for old value |

The "scratch" copy of the candidate configuration can be discarded after the comparison.

In the alternative embodiment in which optional step 550 is performed, the comparison may be limited to the determined present hierarchical level and category, and any of its descendants. For example, referring to FIG. 7, if the user was in the "interface" category of the fourth hierarchical level 730, only the interface configuration information and all configuration information descending from (i.e., contained in) the interface category would be compared. This illustrates default scoping. In a further alternative embodiment, at block 550, the user could enter an explicit information for scoping the comparison. For example, referring to FIG. 7, the user could specify that the comparison be only for the "area" category of the third hierarchical level 720, and all configuration information descending from the "area" category (only some of which is shown in FIG. 7). In this way, selected part(s) of, rather than the entire, sets of configuration information may be compared.

Regardless of what is compared, the comparison results may be printed, displayed, and/or saved as indicated block 580, before the method 310c' is left via RETURN node 590. For example, configuration information removed in the candidate configuration information may be denoted by a "–" symbol, and additions may be denoted by a "+" symbol. Other symbols, or font attributes may be used to denote additions, deletions and changes.

§ 4.3.3 Exemplary Hardware Architectures

Figure 20:
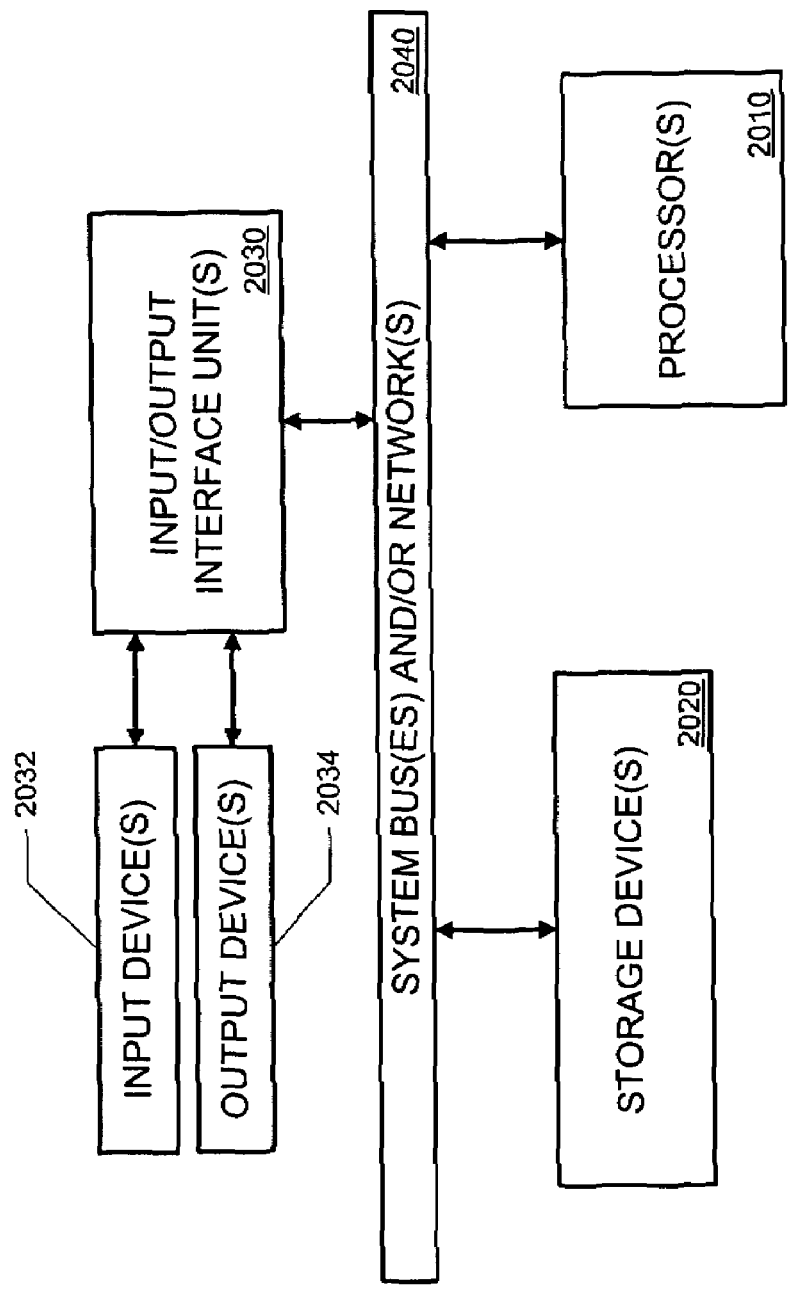
FIG. 20 is a high-level block diagram that illustrates an exemplary machine that may be used to effect various operations of the present invention.

FIG. 20 is high-level block diagram of a machine 2000 which may effect one or more of the operations, and store one or more of the data structures, discussed above. The machine 2000 basically includes a processor(s) 2010, an input/output interface unit(s) 2030, a storage device(s) 2020, and a system bus(es) and/or a network(s) 2040 for facilitating the communication of information among the coupled elements. An input device(s) 2032 and an output device(s) 2034 may be coupled with the input/output interface(s) 2030. Operations of the present invention may be effected by the processor(s) 2010 executing instructions. The instructions may be stored in the storage device(s) 2020 and/or received via the input/output interface(s) 2030. The instructions may be functionally grouped into processing modules.

The machine 2000 may be a router for example. In an exemplary router, the processor(s) 2010 may include a microprocessor and/or (e.g., custom) integrated circuit(s). In the exemplary router, the storage device(s) 2020 may include ROM, RAM, SDRAM, SRAM, SSRAM, DRAM, flash drive(s), hard disk drive(s), and/or flash cards. At least some of these storage device(s) 2020 may include program instructions defining an operating system, a protocol daemon, and/or other daemons. In a preferred embodiment, the methods of the present invention may be effected by a microprocessor executing stored program instructions (e.g., defining a part of the protocol daemon). At least a portion of the machine executable instructions may be stored (temporarily or more permanently) on the storage device(s) 2020 and/or may be received from an external source via an input interface unit 2030. Finally, in the exemplary router, the input/output interface unit(s) 2030, input device(s) 2032 and output device(s) 2034 may include interfaces to terminate communications links. The input device(s) 2032 may include a keyboard.

Naturally, the operations of the present invention may be effected on systems other than routers. Such other systems may employ different hardware and/or software.

§ 4.4 Operational Example in an Exemplary Embodiment

The following example illustrates an operation of an exemplary compare configuration method. Suppose that the selected or last committed router configuration information is:

```
...
protocols{
    ospf{
        area 0.0.0.0{
            interface so-0/0/0{
                hello interval 5;
                transmit interval 30;
            }
            interface so-0/0/1{
                hello interval 5;
                transmit interval 30
            }
        }
    }
}
...
``` where the ellipses denote configuration information preceding or following the printed protocols configuration information. Suppose further that the candidate router configuration information is:

```
protocols{
    ospf{
        area 0.0.0.0{
            interface so-0/0/0{
                hello interval 10;
                priority 1;
            }
            interface so-0/0/1{
                hello interval 10;
                priority 3
            }
        }
    }
}
...
```

Assuming that the compare configuration operation is scoped to protocols, ospf, area, the output would be:

```
...
protocols{
    ospf{
        area 0.0.0.0{
            interface so-0/0/0{
```

-continued

```
-               hello interval 5;
+               hello interval 10;
-               transmit interval 30;
+               priority 1;
            }
            interface so-0/0/1{
-               hello interval 5;
+               hello interval 10;
-               transmit interval 30;
+               priority 3
            }
        }
    }
}
...
```

Notice that since the parameter values of the "hello interval" statements were changed from 5 to 10 in the candidate router configuration information, these changes are denoted with "−" and "+" symbols preceding such statements. Notice also that since the "transmit interval" configuration information are not found in the candidate router configuration information, these changes are denoted with "−" symbols. Finally, notice that since the "priority" configuration information is added in the candidate router configuration information, this added information is denoted with "+" symbols.

A control instruction user interface may permit results of earlier control instructions (e.g., SHOW) to be "piped" through a compare instruction. The following control instruction could be used to compare a (e.g., a present hierarchical level and its descendants of) candidate configuration information with (e.g., that of) a second most recently committed set of configuration information:

show|compare rollback 2 where the "|" symbol denotes a piping operation.

§ 4.5 CONCLUSIONS

As can be appreciated from the foregoing disclosure, the present invention helps users to detect errors in a candidate configuration information, for example, before committing to that candidate configuration information. Optional scoping capabilities may be used to limit a compare configurations operation, thereby permitting users to work on smaller, more manageable parts of sets of configuration information. By providing an optional permissions check, only authorized users can create new configuration information and compare it to previously committed configuration information. Such permissions may limit certain users to certain classes of configuration information and/or certain hierarchical levels of the configuration information. Thus, for example, a user authorized to work on "protocols", "routing-instances" and "routing options" configuration information may be prevented from working on "chassis" and "interfaces" configuration information.

What is claimed is:

1. A processor-executable method comprising:
   a) accepting at least a part of a selected set of configuration information for a data forwarding device;
   b) accepting at least a part of a set of candidate configuration information for the data forwarding device; and
   c) determining, using at least one processor, differences, if any, between the at least a part of the set of candidate configuration information for the data forwarding device, and the at least a part of the selected set of configuration information for the data forwarding device,
wherein the set of candidate configuration information for the data forwarding device includes a plurality of statements,
wherein a first statement of the plurality of statements of the set of candidate configuration information for the data forwarding device contains a second statement of the plurality of statements to define at least a part of a hierarchical configuration,
wherein the selected set of configuration information for the data forwarding device includes a plurality of statements,
wherein a first statement of the plurality of statements of the selected set of configuration information for the data forwarding device contains a second statement of the plurality of statements to define at least a part of a hierarchical configuration,
wherein the at least the part of the set of candidate configuration information only includes a defined first statement and any of the plurality of statements that are descendants of the defined first statement in the hierarchical configuration, and
wherein the at least the part of the selected set of configuration information includes a corresponding first statement and any of the plurality of statements that are descendants of the defined first statement in the hierarchical configuration.

2. The processor-executable method of claim 1 wherein the selected set of configuration information for a data forwarding device is a most recently committed set of configuration information for the data forwarding device.

3. The processor-executable method of claim 1 wherein the selected set of configuration information for a data forwarding device is selected by a user.

4. The processor-executable method of claim 1 wherein the defined first statement is defined based on a statement of the hierarchical candidate configuration information on which a user is presently working.

5. The processor-executable method of claim 1 wherein the defined first statement is defined by a user input.

6. The processor-executable method of claim 1 wherein the hierarchical configuration information includes at least two categories at a first hierarchical level, and
wherein the at least two categories are selected from a group of data forwarding device configuration categories consisting of:
A) chassis configuration information;
B) class of service configuration information;
C) firewall configuration information;
D) forwarding options configuration information;
E) groups configuration information;
F) interfaces configuration information;
G) policy options configuration information;
H) protocols configuration information;
I) routing instances configuration information;
J) routing options configuration information;
K) network management protocol configuration information; and
L) system configuration information.

7. The processor-executable method of claim 1 wherein the hierarchical configuration information includes at least two categories at a given hierarchical level, the method further comprising:
d) associating a predetermined permission value with a user that is logged in; and
e) determining, using the at least one processor whether the logged in user is permitted to access one of the at least two categories of configuration information based on the predetermined permission.

8. A method comprising:
a) accepting at least a part of a selected set of configuration information for a data forwarding device;
b) accepting at least a part of a set of candidate configuration information for the data forwarding device; and
c) determining differences, if any, between
the at least a part of the set of candidate configuration information for the data forwarding device, and
the at least a part of the selected set of configuration information for the data forwarding device,
wherein the act of accepting at least a part of a selected set of configuration information for a data forwarding device is performed by accessing a storage device of the data forwarding device,
wherein the act of accepting at least a part of a set of candidate configuration information for the data forwarding device is performed by accessing a storage device of the data forwarding device; and
wherein the act of determining differences, if any, between
the at least the part of the set of candidate configuration information for the data forwarding device, and
the at least the part of the selected set of configuration information for the data forwarding device,
is performed by a component of the data forwarding device.

9. The method of claim 8 wherein the selected set of configuration information for a data forwarding device is a most recently committed set of configuration information for the data forwarding device.

10. The method of claim 8 wherein the selected set of configuration information for a data forwarding device is selected by a user.

11. The method of claim 8 wherein the candidate set of configuration information is an uncommitted candidate configuration, and
wherein the selected set of configuration information is a configuration that has been saved on the data forwarding device as a committed configuration.

12. A processor-executable method comprising:
a) accepting at least a part of a selected set of configuration information for a data forwarding device;
b) accepting at least a part of a set of candidate configuration information for the data forwarding device; and
c) determining, using at least one processor, differences, if any, between
the at least a part of the set of candidate configuration information for the data forwarding device, and
the at least a part of the selected set of configuration information for the data forwarding device,
wherein the set of candidate configuration information for the data forwarding device includes a plurality of statements,
wherein the selected set of configuration information for the data forwarding device includes a plurality of statements, and
wherein the act of determining differences, if any, between
the at least a part of the set of candidate configuration information for the data forwarding device, and
the at least a part of the selected set of configuration information for the data forwarding device, considers changes to statements without regard to parameter values.

13. The processor-executable method of claim 12 wherein the selected set of configuration information for a data forwarding device is a most recently committed set of configuration information for the data forwarding device.

14. The processor-executable method of claim 12 wherein the selected set of configuration information for a data forwarding device is selected by a user.

15. In a data forwarding device, a facility for checking at least a part of a set of candidate configuration information, the facility comprising:
   a) a storage device for storing at least one set of configuration information for the data forwarding device;
   b) an input facility for
      i) accepting at least a part of a selected one of the at least one set of configuration information for a data forwarding device accessed from the storage device of the data forwarding device, and
      ii) accepting at least a part of a set of candidate configuration information for the data forwarding device accessed from the storage device of the data forwarding device; and
   c) a configuration comparison facility for determining differences, if any, between
      the at least a part of the set of candidate configuration information for the data forwarding device, and
      the at least a part of the selected one of the at least one set of configuration information for the data forwarding device.

16. A method for determining differences in at least a part of sets of configuration information, comprising:
   a) accepting at least a part of a first set of configuration information for a data forwarding device, wherein the first set of configuration information has not been saved on the data forwarding device as a committed configuration, and wherein no copied instance of the first set of configuration information has been saved on the data forwarding device as a committed configuration;
   b) accepting at least a part of a second set of configuration information for the data forwarding device, wherein the second set of configuration information has been saved on the data forwarding device;
   c) determining, using at least one processor, differences, if any, between
      the first set of configuration information for a data forwarding device, and
      the second set of configuration information for a data forwarding device; and
   d) displaying using a display device the determined differences, wherein the determined differences are indicated by at least one of special characters preceding changed lines of configuration information, special symbols preceding changed lines of configuration information, special font characteristics applied to changed versus unchanged lines of the configuration information, and special font characteristics applied to changed versus unchanged sections of the configuration information.

17. The method of claim 16 wherein the first set of configuration information for a data forwarding device includes a plurality of statements,
   wherein a first statement of the plurality of statements of the first set of configuration information for a data forwarding device contains a second statement of the plurality of statements to define at least a part of a hierarchical configuration,
   wherein the second set of configuration information for a data forwarding device includes a plurality of statements, and
   wherein a first statement of the plurality of statements of the second set of configuration information for a data forwarding device contains a second statement of the plurality of statements to define at least a part of a hierarchical configuration.

18. The method of claim 17 wherein the at least the part of the first set of configuration information for a data forwarding device only includes a defined first statement and any of the plurality of statements that are descendants of the defined first statement in the hierarchical configuration, and
   wherein the at least the part of the second set of configuration information for a data forwarding device includes a corresponding first statement and any of the plurality of statements that are descendants of the defined first statement in the hierarchical configuration.

19. The method of claim 18 wherein the defined first statement is defined by a user input.

20. The method of claim 17 wherein the hierarchical configuration information includes at least two categories at a first hierarchical level, and
   wherein the at least two categories are selected from a group of data forwarding device configuration categories consisting of:
   A) chassis configuration information;
   B) class of service configuration information;
   C) firewall configuration information;
   D) forwarding options configuration information;
   E) groups configuration information;
   F) interfaces configuration information;
   G) policy options configuration information;
   H) protocols configuration information;
   I) routing instances configuration information;
   J) routing options configuration information;
   K) network management protocol configuration information; and
   L) system configuration information.

21. The method of claim 16 wherein the act of accepting at least a part of the first set of configuration information for the data forwarding device is performed by accessing a storage device of the data forwarding device,
   wherein the act of accepting at least a part of the second set of configuration information for the data forwarding device is performed by accessing a storage device of the data forwarding device, and
   wherein the act of determining differences, if any, between
      the first set of configuration information for the data forwarding device, and
      the second set of configuration information for the data forwarding device,
   is performed by a component of the data forwarding device.

22. The method of claim 16 wherein the first set of configuration information for a data forwarding device includes a plurality of statements, at least some of which define parameter values,
   wherein the second set of configuration information for the data forwarding device includes a plurality of statements, at least some of which define parameter values, and
   wherein the act of determining differences, if any, between
      the first set of configuration information for the data forwarding device, and
      the second set of configuration information for the data forwarding device, considers a selected one of (a) statements only, (b) parameter values only, and (c) statements and parameter values.

23. The method of claim 16 wherein a command to save the first set of configuration information on the data forwarding device as a committed configuration has not occurred.

24. The method of claim 16 wherein the first set of configuration information is from an uncommitted candidate configuration, and
    wherein the second set of configuration information is from a configuration that has been saved on the data forwarding device as a committed configuration.

25. In a data forwarding device, a facility for comparing at least a part of sets of configuration information, the facility comprising:
    a) a storage device for storing at least two sets of configuration information for the data forwarding device;
    b) an input facility for
        i) accepting at least a part of a first selected one of the at least two sets of configuration information for the data forwarding device accessed from the storage device of the data forwarding device, and
        ii) accepting at least a part of a second selected one of the at least two sets of configuration information for the data forwarding device accessed from the storage device of the data forwarding device; and
    c) a configuration comparison facility for determining differences, if any, between
        the first selected one of the at least two sets of configuration information for the data forwarding device, and
        the second selected one of the at least two sets of configuration information for the data forwarding device.

26. A method comprising:
    receiving with a data forwarding device, a first set of configuration information for the data forwarding device, wherein the first set of configuration information has not yet been committed on the data forwarding device, and wherein no copied instance of the first set of configuration information has been saved on the data forwarding device as a committed configuration;
    receiving with the data forwarding device, a second set of configuration information for the data forwarding device;
    determining with the data forwarding device, differences between the first and second sets of configuration information; and
    displaying, using a display device, the determined differences, wherein the determined differences are indicated by at least one of special characters preceding changed lines of configuration information, special symbols preceding changed lines of configuration information, special font characteristics applied to changed versus unchanged lines of the configuration information, and special font characteristics applied to changed versus unchanged sections of the configuration information.

27. The method according to claim 26, wherein the data forwarding device is a router.

\* \* \* \* \*